(12) United States Patent
Kuroda

(10) Patent No.: US 9,900,730 B2
(45) Date of Patent: Feb. 20, 2018

(54) METHOD FOR CONTROLLING STORAGE BATTERY PACK AND STORAGE BATTERY PACK

(71) Applicant: Panasonic Intellectual Property Management Co., Ltd., Osaka (JP)

(72) Inventor: Go Kuroda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/163,678

(22) Filed: May 25, 2016

(65) Prior Publication Data

US 2016/0360347 A1 Dec. 8, 2016

(30) Foreign Application Priority Data

Jun. 4, 2015 (JP) ................. 2015-114186

(51) Int. Cl.
*H04W 4/00* (2009.01)
*H04B 5/00* (2006.01)
*H04W 76/02* (2009.01)
*H04W 8/00* (2009.01)

(52) U.S. Cl.
CPC .......... *H04W 4/008* (2013.01); *H04B 5/0056* (2013.01); *H04W 76/023* (2013.01); *H04W 8/005* (2013.01)

(58) Field of Classification Search
CPC .. H02J 7/00–7/34; H04B 5/0025–5/02; H04W 60/00–60/06; H04W 4/008
See application file for complete search history.

(56) References Cited

U.S. PATENT DOCUMENTS

| | | | | |
|---|---|---|---|---|
| 5,771,448 A | * | 6/1998 | Cooper | H04B 1/3816 455/343.3 |
| 6,212,410 B1 | * | 4/2001 | Ishida | G08B 13/1418 455/410 |
| 7,069,444 B2 | * | 6/2006 | Lowensohn | G06F 21/35 713/185 |
| 8,442,433 B2 | * | 5/2013 | Wang | G06F 9/44505 235/375 |
| 9,407,624 B1 | * | 8/2016 | Myers | H04L 63/08 |

(Continued)

FOREIGN PATENT DOCUMENTS

JP 2014-199728 10/2014

*Primary Examiner* — Gennadiy Tsvey
(74) *Attorney, Agent, or Firm* — Greenblum & Bernstein, P.L.C.

(57) ABSTRACT

In a method, when a first information terminal, which is provided with a wireless communication device capable of communicating with a first wireless communication device provided in a storage battery pack and which retains first identification information indicating a user of the storage battery pack, comes into close proximity with the first wireless communication device (S11), the first information terminal is registered in registration information as a first type of information terminal capable of altering the registration information, the registration information being stored in a storage device provided inside or outside of the storage battery pack, and being of information terminals capable of acquiring information relating to the storage battery pack stored in the storage device (S12).

20 Claims, 21 Drawing Sheets

(56) References Cited

U.S. PATENT DOCUMENTS

| | | | | |
|---|---|---|---|---|
| 2004/0049697 | A1* | 3/2004 | Edwards, Jr. | G06F 21/31 726/5 |
| 2006/0041944 | A1* | 2/2006 | Yano | G06F 21/121 726/27 |
| 2006/0044609 | A1* | 3/2006 | Kato | H04N 1/00342 358/1.15 |
| 2006/0072468 | A1* | 4/2006 | Trollope | H04L 41/0846 370/241.1 |
| 2006/0267544 | A1* | 11/2006 | Montvay | H01M 2/0267 320/106 |
| 2009/0199188 | A1* | 8/2009 | Fujimaki | G06F 21/629 718/101 |
| 2009/0237201 | A1* | 9/2009 | Sato | H04N 1/00244 340/5.2 |
| 2009/0318190 | A1* | 12/2009 | Shinozaki | G06F 21/77 455/558 |
| 2010/0171460 | A1* | 7/2010 | Nakajima | H01M 2/34 320/106 |
| 2011/0078092 | A1* | 3/2011 | Kim | B60L 11/1824 705/412 |
| 2011/0129238 | A1* | 6/2011 | Muranaka | G03G 15/55 399/12 |
| 2011/0274273 | A1* | 11/2011 | Fiske | G06F 21/32 380/46 |
| 2012/0039326 | A1* | 2/2012 | Chia | H04L 63/04 370/342 |
| 2012/0078444 | A1* | 3/2012 | Mase | G06F 21/88 701/2 |
| 2012/0121089 | A1* | 5/2012 | Morioka | H04L 9/0827 380/270 |
| 2012/0217971 | A1* | 8/2012 | Deluca | H04B 5/0043 324/426 |
| 2013/0015982 | A1* | 1/2013 | Matsumoto | G06Q 50/06 340/870.02 |
| 2013/0082653 | A1* | 4/2013 | Lee | H02J 7/0027 320/108 |
| 2013/0093384 | A1* | 4/2013 | Nyu | G01R 31/3606 320/107 |
| 2013/0148283 | A1* | 6/2013 | Forutanpour | G01R 31/3606 361/679.31 |
| 2013/0200811 | A1* | 8/2013 | Steininger | H05B 37/0245 315/159 |
| 2014/0222687 | A1* | 8/2014 | Cao | G06Q 20/3821 705/71 |
| 2014/0223512 | A1* | 8/2014 | Hagiwara | H04L 63/20 726/4 |
| 2014/0239647 | A1* | 8/2014 | Jadallah | E05C 19/002 292/140 |
| 2014/0333425 | A1* | 11/2014 | Giraud | G07C 5/008 340/438 |
| 2014/0354291 | A1* | 12/2014 | Kikuchi | H01M 10/441 324/434 |
| 2014/0370879 | A1* | 12/2014 | Redding | H04W 4/001 455/419 |
| 2015/0035475 | A1* | 2/2015 | Li | H02J 7/0029 320/107 |
| 2015/0038086 | A1* | 2/2015 | Kim | H04W 4/008 455/41.3 |
| 2015/0082032 | A1* | 3/2015 | Bruce | G06F 9/468 713/168 |
| 2015/0096015 | A1* | 4/2015 | Ren | G06F 21/35 726/20 |
| 2015/0162646 | A1* | 6/2015 | Kawase | H01M 2/1022 429/7 |
| 2015/0206126 | A1* | 7/2015 | Zeinecker | H04L 63/0853 705/44 |
| 2015/0367743 | A1* | 12/2015 | Lin | B60L 11/1822 320/109 |
| 2016/0039291 | A1* | 2/2016 | Reese | B60L 3/12 701/29.3 |
| 2016/0211985 | A1* | 7/2016 | Castillo | F24F 11/006 |
| 2016/0212129 | A1* | 7/2016 | Johnston | G06F 21/73 |

* cited by examiner

| TERMINAL ID | TERMINAL TYPE |
|---|---|
| 00001 | FIRST TYPE |
| 00002 | SECOND TYPE |
| 00003 | FIRST TYPE |
| 00004 | SECOND TYPE |
| 00005 | SECOND TYPE |
| ⋮ | ⋮ |

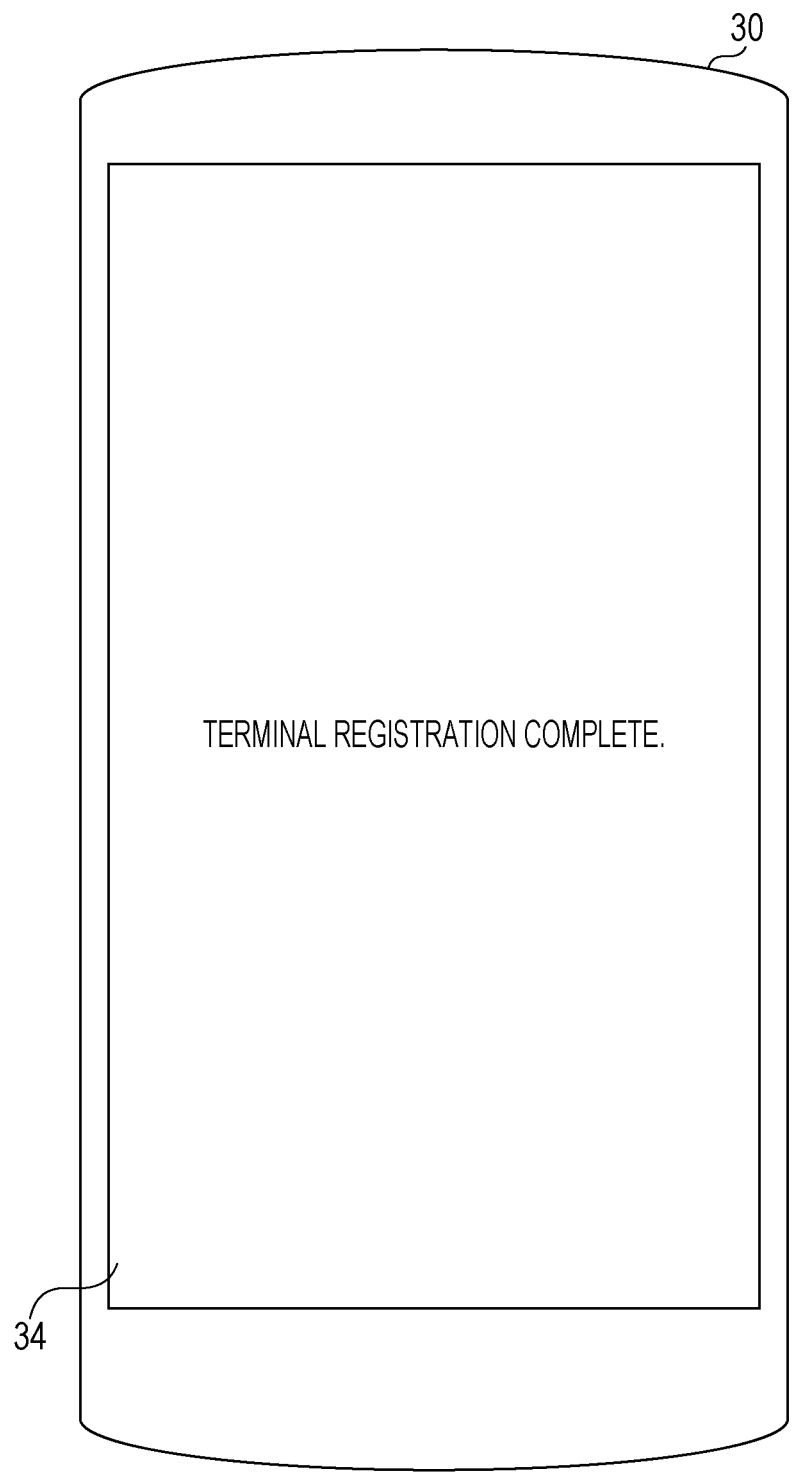

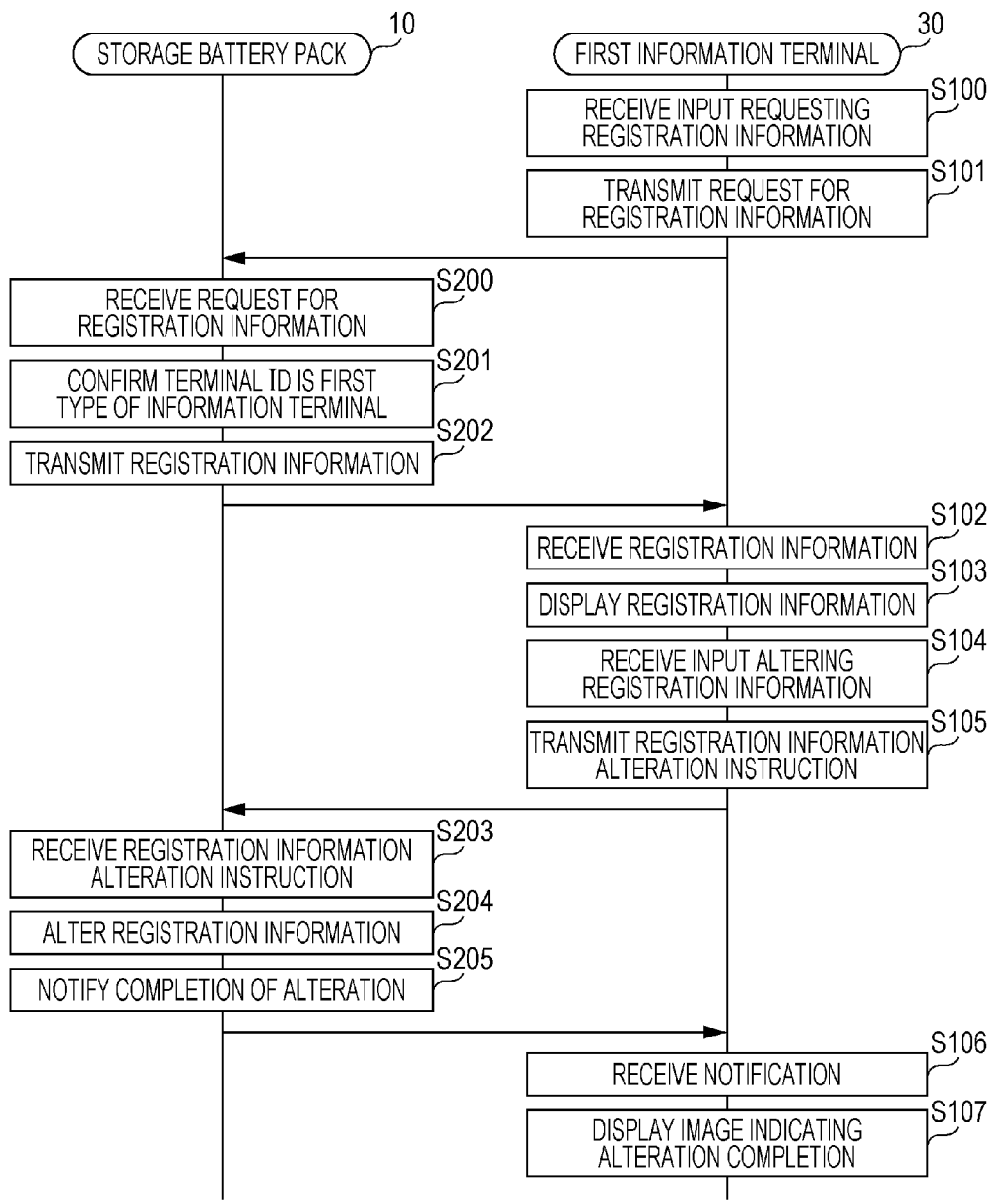

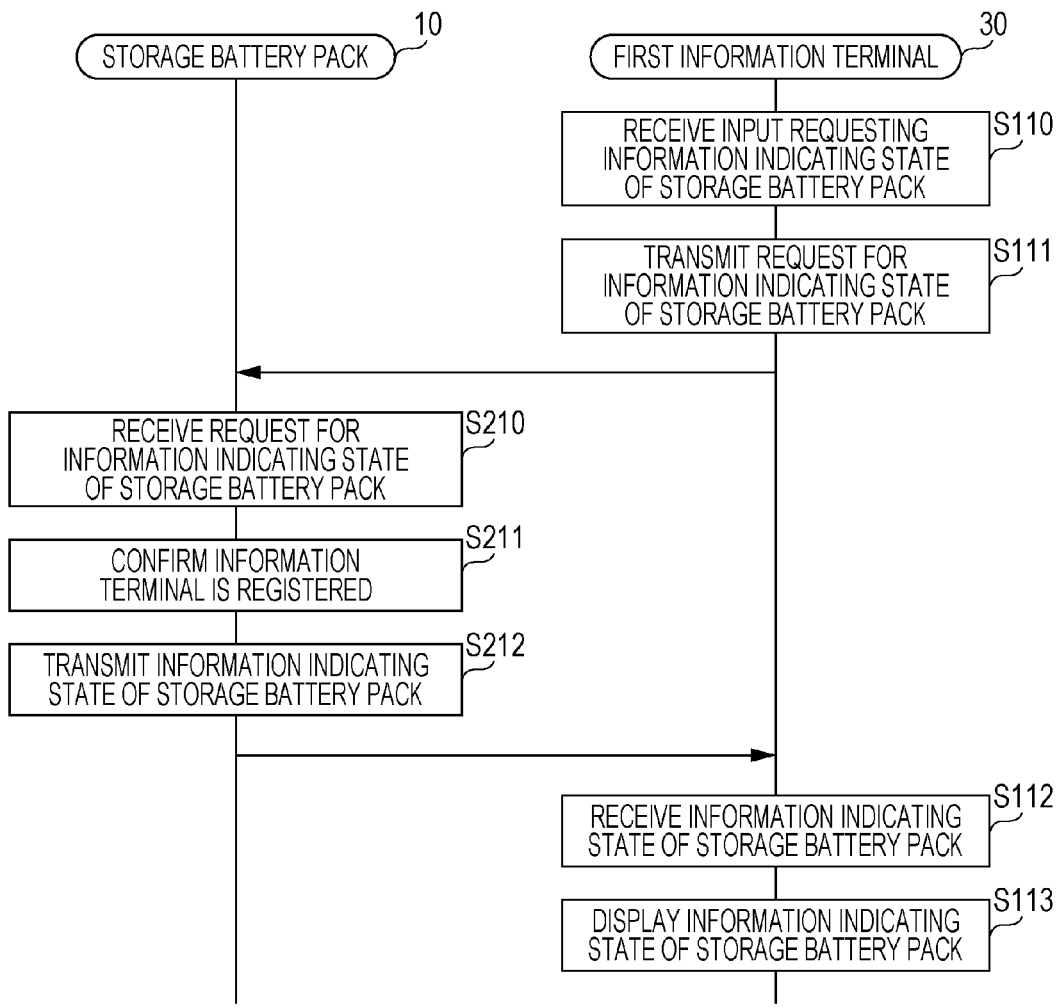

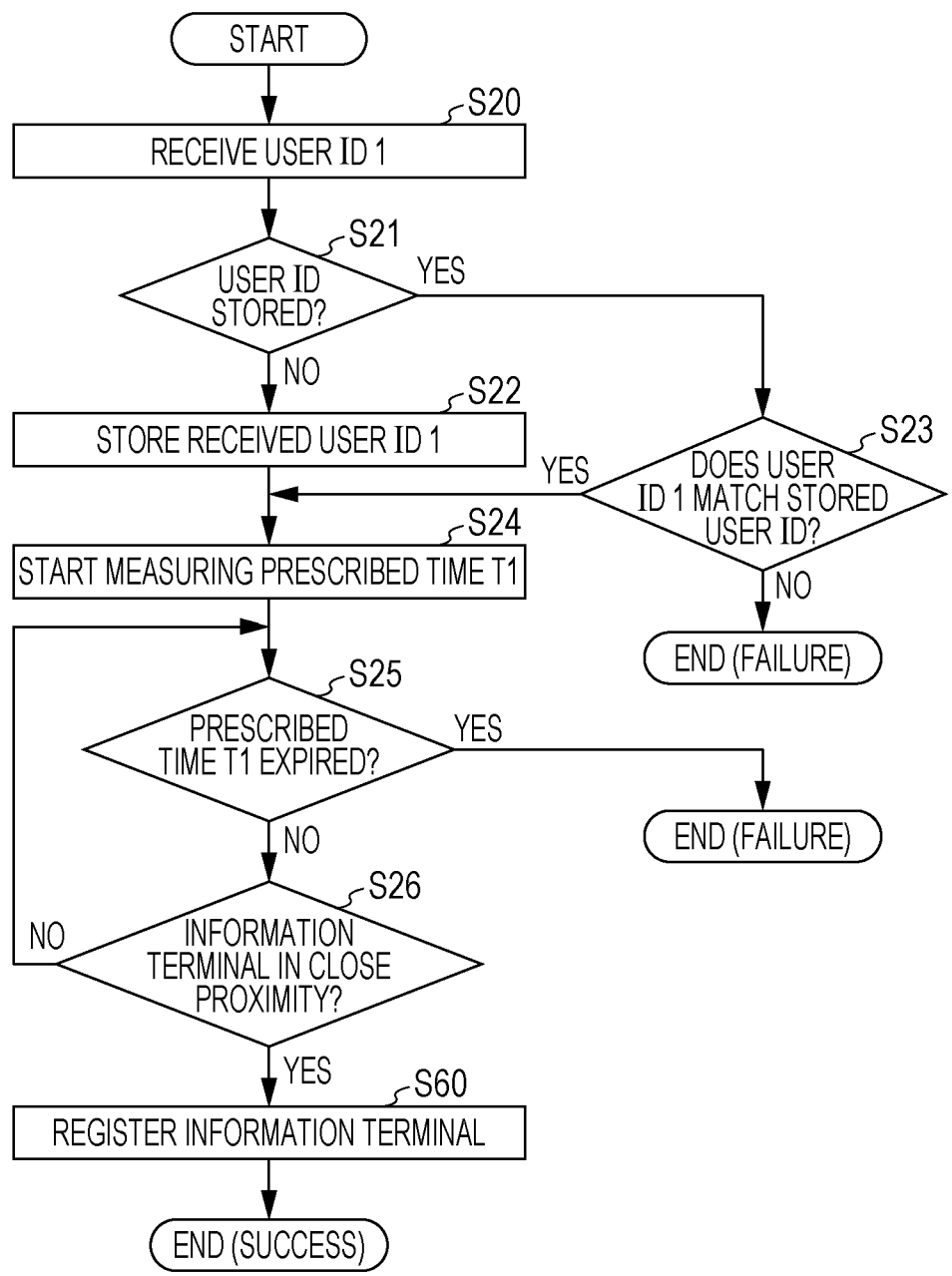

METHOD FOR CONTROLLING STORAGE BATTERY PACK AND STORAGE BATTERY PACK

BACKGROUND

1. Technical Field

The present disclosure relates to a method for controlling a storage battery pack and a storage battery pack.

2. Description of the Related Art

Japanese Unexamined Patent Application Publication No. 2014-199728 discloses a storage battery pack capable of close-proximity wireless communication with an external device. The external device acquires information indicating the state of the storage battery pack from the storage battery pack by means of short-range wireless communication.

SUMMARY

In the aforementioned storage battery pack, a configuration with which only preregistered information terminals are able to acquire information from the storage battery pack is feasible from the viewpoint of information protection. In this regard, there is room for examination of the method for registering information terminals.

One non-limiting and exemplary embodiment provides a method for controlling a storage battery pack and a storage battery pack with which an information terminal can be easily registered.

In one general aspect, the techniques disclosed here feature a method for controlling a storage battery pack including: (a) when a first information terminal, which is provided with a wireless communication device capable of communicating with a first wireless communication device provided in the storage battery pack and which retains first identification information indicating the user of the storage battery pack, comes into close proximity with the first wireless communication device, the first information terminal being registered in registration information as a first type of information terminal capable of altering the registration information, the registration information being stored in a storage device that is provided inside or outside of the storage battery pack and having registered therein information terminals capable of acquiring information relating to the storage battery pack.

According to the method for controlling a storage battery pack and the storage battery pack of the present disclosure, an information terminal can be easily registered.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7B is a second drawing for describing an example of a display screen that is displayed on an information terminal;

FIG. 8 is a sequence diagram of registration information acquisition and alteration processing;

FIG. 10 is a sequence diagram of acquisition processing for information indicating the state of a storage battery pack;

FIG. 19 is a flowchart of a registration operation of a storage battery pack according to embodiment 5.

DETAILED DESCRIPTION

Figure 1:
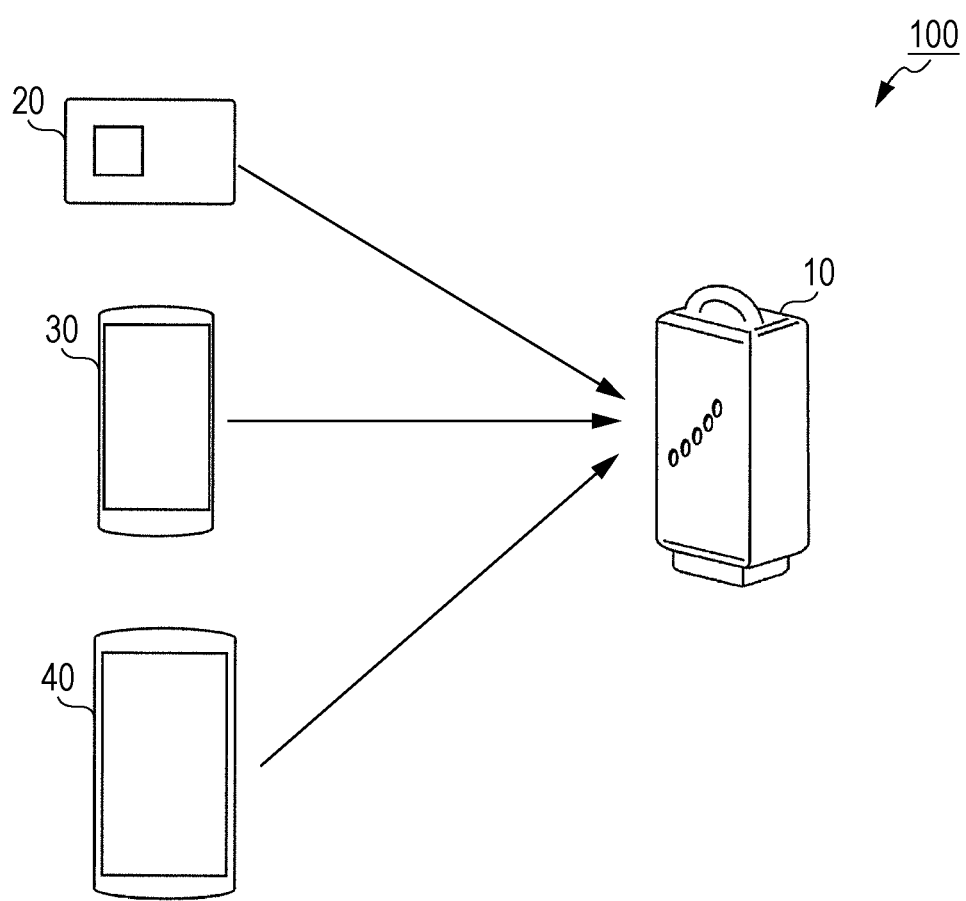
FIG. 1 is a drawing depicting an overview of an information terminal registration system according to embodiment 1.

A method for controlling a storage battery pack according to a first aspect of the present disclosure is a method for controlling a storage battery pack including: (a) when a first information terminal, which is provided with a wireless communication device capable of communicating with a first wireless communication device provided in the storage battery pack and which retains first identification information indicating a user of the storage battery pack, comes into close proximity with the first wireless communication device, registering in registration information the first information terminal as a first type of information terminal capable of altering the registration information, the registration information being stored in a storage device that is provided inside or outside of the storage battery pack and having registered therein information terminals capable of acquiring information relating to the storage battery pack.

The user is thereby able to easily register the first information terminal as a first type of information terminal merely by inputting the first identification information to the first information terminal and moving close to the storage battery pack.

Here, the aforementioned "comes into close proximity" means the first information terminal approaches a location at which the first wireless communication device is able to communicate with the wireless communication device in the first information terminal.

Furthermore, with regard to a method for controlling a storage battery pack according to a second aspect of the present disclosure, in the method for controlling a storage battery pack of the aforementioned first aspect, the first type of information terminal may be an information terminal that is capable of altering the registration information, and is capable of acquiring the information relating to the storage battery pack from the storage battery pack.

The user is thereby able to acquire, for example, registration information and information relating to the storage battery pack via the first information terminal that is registered as a first type of information terminal.

Furthermore, with regard to a method for controlling a storage battery pack according to a third aspect of the present disclosure, in the method for controlling a storage battery pack of the aforementioned second aspect, the information relating to the storage battery pack may be information indicating the state of the storage battery pack.

The user is thereby able to acquire information indicating the state of the storage battery pack via the first information terminal that is registered as a first type of information terminal.

Furthermore, with regard to a method for controlling a storage battery pack according to a fourth aspect of the present disclosure, in the method for controlling a storage battery pack of the aforementioned second aspect, the information relating to the storage battery pack may be information relating to an electrical device onto which the storage battery pack is mounted.

The user is thereby able to acquire information relating to the electrical device onto which the storage battery pack is mounted, via the first information terminal that is registered as a first type of information terminal.

Furthermore, a method for controlling a storage battery pack according to a fifth aspect of the present disclosure may, in the method for controlling a storage battery pack of the aforementioned first aspect, further include: (b) altering the content of the registration information based on an instruction to alter the registration information, the instruction being transmitted from the first information terminal registered as the first type of information terminal.

The user is thereby able to alter the registration information via the first information terminal.

Furthermore, the method for controlling a storage battery pack according to a sixth aspect of the present disclosure may, in the method for controlling a storage battery pack of the aforementioned first aspect, further include: (c) receiving the first identification information via the first wireless communication device; and (d) when a second information terminal, which is provided with a wireless communication device capable of communicating with the first wireless communication device and which does not retain the first identification information, comes into close proximity with the first wireless communication device within a prescribed time from after the first identification information has been received, registering in the registration information the second information terminal as a second type of information terminal, which is an information terminal that is not capable of altering the registration information from the storage battery pack, and is capable of acquiring, from the storage battery pack, other information relating to the storage battery pack that is different from the registration information.

The user is thereby able to easily register the second information terminal as a second type of information terminal by bringing a device retaining the first identification information close to the storage battery pack, and then bringing the second information terminal close to the storage battery pack within the prescribed time.

Furthermore, the method for controlling a storage battery pack according to a seventh aspect of the present disclosure may, in the method for controlling a storage battery pack of the aforementioned first aspect, further include: (c) receiving the first identification information via the first wireless communication device; and (e) when a second information terminal, which is provided with a wireless communication device capable of communicating with the first wireless communication device and which retains the first identification information, comes into close proximity with the first wireless communication device within a prescribed time from after the first identification information has been received, registering in the registration information the second information terminal as the first type of information terminal.

The user is thereby able to easily register the second information terminal as a first type of information terminal by bringing a device retaining the first identification information close to the storage battery pack, and then bringing the second information terminal, which has the first identification information input thereto, close to the storage battery pack within the prescribed time.

Furthermore, with regard to a method for controlling a storage battery pack according to an eighth aspect of the present disclosure, in the method for controlling a storage battery pack of the aforementioned sixth aspect, in (e), when the second information terminal, which does not retain the first identification information and retains second identification information that is different from the first identification information, comes into close proximity, registering in the registration information the second information terminal as the second type of information terminal.

It is thereby possible to suppress an information terminal not retaining the second identification information from being erroneously registered as a second type of information terminal.

Furthermore, with regard to a method for controlling a storage battery pack according to a ninth aspect of the present disclosure, in the method for controlling a storage battery pack of the aforementioned sixth aspect, the other information relating to the storage battery pack may be information indicating the state of the storage battery pack.

The user is thereby able to acquire information indicating the state of the storage battery pack via the second information terminal that is registered as a second type of information terminal.

Furthermore, with regard to a method for controlling a storage battery pack according to a tenth aspect of the present disclosure, in the method for controlling a storage battery pack of the aforementioned sixth aspect, the other information relating to the storage battery pack may be information relating to an electrical device onto which the storage battery pack is mounted.

The user is thereby able to acquire information relating to the electrical device onto which the storage battery pack is mounted, via the second information terminal that is registered as a second type of information terminal.

Furthermore, with regard to a method for controlling a storage battery pack according to an eleventh aspect of the present disclosure, in any one of the methods for controlling a storage battery pack of the aforementioned sixth to eighth aspects, in (c), the first wireless communication device may receive the first identification information due to the first information terminal coming into close proximity with the first wireless communication device.

The user is thereby able to start registration processing for the second information terminal by bringing the first information terminal into close proximity with the first wireless communication device.

Furthermore, with regard to a method for controlling a storage battery pack according to a twelfth aspect of the present disclosure, in any one of the methods for controlling a storage battery pack of the aforementioned sixth to eighth aspects, in (c), the first wireless communication device may receive the first identification information due to a third information terminal, which is provided with a wireless communication device capable of communicating with the first wireless communication device and which retains the first identification information, coming into close proximity with the first wireless communication device.

The user is thereby able to start registration processing for the second information terminal by bringing a third information terminal that is different from the first information terminal into close proximity with the first wireless communication device.

Furthermore, with regard to a method for controlling a storage battery pack according to a thirteenth aspect of the present disclosure, in any one of the methods for controlling a storage battery pack of the aforementioned sixth to eighth aspects, in (c), the first wireless communication device may receive the first identification information due to an external device coming into close proximity with the first wireless communication device, and the external device may be a device that is provided with a wireless communication device capable of communicating with the first wireless communication device, retains the first identification information, and is not able to refer to the registration information.

The user is thereby able to start registration processing for the second information terminal by bringing an external device retaining the first identification information into close proximity with the first wireless communication device.

Furthermore, a method for controlling a storage battery pack according to a fourteenth aspect of the present disclosure may, in the method for controlling a storage battery pack of the aforementioned first aspect, further include: (f) storing identification information in the storage device prior to (a); (g) when the first information terminal comes into close proximity, acquiring the first identification information retained by the first information terminal; and (h) comparing the acquired first identification information with the stored identification information, in which, in (a), when the acquired first identification information and the stored identification information match as a result of the comparing, the first information terminal may be registered in the registration information as the first type of information terminal.

It is thereby possible to suppress the erroneous registration of an information terminal retaining different identification information from the identification information stored in the storage device.

Furthermore, with regard to a method for controlling a storage battery pack according to a fifteenth aspect of the present disclosure, in the method for controlling a storage battery pack of the aforementioned fourteenth aspect, in (f), the identification information may be stored in the storage device due to an external device, which is provided with a wireless communication device capable of communicating with the first wireless communication device, retains the first identification information, and is not able to refer to the registration information, coming into close proximity with the first wireless communication device.

It is thereby possible for the first identification information to be stored in the storage device by the user bringing an external device such as a registration card into close proximity with the storage battery pack.

Furthermore, a method for controlling a storage battery pack according to a sixteenth aspect of the present disclosure may, in the method for controlling a storage battery pack of the aforementioned first aspect, further include: (i) when the first information terminal comes into close proximity, acquiring the first identification information being acquired via the first wireless communication device from the first information terminal, and determining whether or not the acquired first identification information is appropriate, in which (a) may be executed when it is determined in (i) that the first identification information is appropriate.

It is thereby possible to suppress the registration of an information terminal by means of improper identification information.

Furthermore, a method for controlling a storage battery pack according to a seventeenth aspect of the present disclosure may, in the method for controlling a storage battery pack of the aforementioned first aspect, further include: (j) when the first information terminal comes into close proximity, acquiring the first identification information via the first wireless communication device from the first information terminal, and confirming in a server device provided outside of the storage battery pack whether or not the acquired first identification information is appropriate, in which (a) may be executed when it is confirmed in (j) that the first identification information is appropriate.

It is thereby possible to suppress the registration of an information terminal by means of improper identification information.

A storage battery pack according to an aspect of the present disclosure includes: a first wireless communication device capable of wirelessly communicating with a first information terminal; and a control device that, when the first information terminal retaining first identification information indicating the user of the storage battery pack comes into close proximity with the first wireless communication device, registers the first information terminal in registration information as a first type of information terminal capable of altering the registration information, the registration information being stored in a storage device provided inside or outside of the storage battery pack and being of information terminals capable of acquiring information relating to the storage battery pack.

The user is thereby able to easily register the first information terminal as a first type of information terminal merely by inputting the first identification information to the first information terminal and moving close to the storage battery pack.

Hereinafter, embodiments will be described in detail using the drawings. It should be noted that the embodiments described hereinafter all represent comprehensive or specific examples. The numerical values, the shapes, the constituent elements, the arrangement positions and modes of connection of the constituent elements, the processing steps, the order of the steps and the like given in the following embodiments are examples. Consequently, the present disclosure is not limited by these embodiments. Furthermore, constituent elements that are not described in the independent claims indicating the most significant concepts of the present disclosure from among the constituent elements in the embodiments hereinafter are described as optional constituent elements.

Furthermore, the drawings are schematic views, and have not necessarily been illustrated in an exact manner. Furthermore, in the drawings, the same reference symbols have been appended to configurations that are substantially the same, and redundant descriptions may be omitted or simplified.

Embodiment 1

[Configuration]

Figure 2:
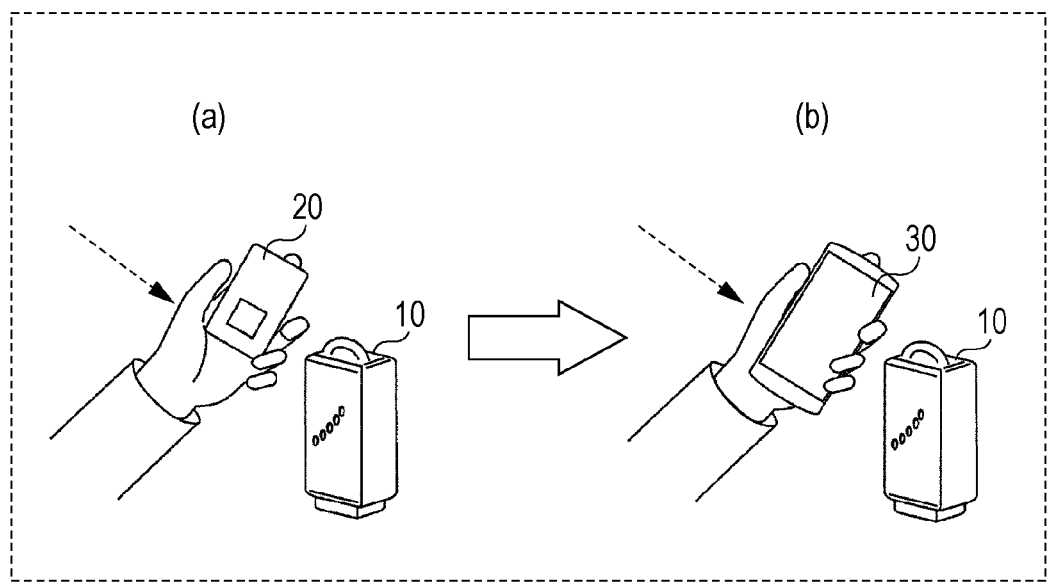
FIG. 2 is a drawing depicting an overview of a method for registering an information terminal according to embodiment 1.

First, an overview of an information terminal registration system according to embodiment 1 will be described. FIG. 1 is a drawing depicting an overview of the information terminal registration system. FIG. 2 is a drawing depicting an overview of a method for registering an information terminal.

A registration system 100 depicted in FIG. 1 is a system in which information terminals such as a first information terminal 30 and a second information terminal 40 are registered in a storage battery pack 10.

The storage battery pack 10 is detachably connected to an electrical device and used as a direct-current power source for the electrical device, and has a near field communication (NFC) module housed therein. That is, the storage battery pack 10 is capable of short-range wireless communication using the NFC module. Moreover, the storage battery pack 10 has a terminal device that is detachably connected to the electrical device at a base section, and supplies power to the electrical device via the terminal device.

Furthermore, the first information terminal 30 and the second information terminal 40 are smartphones, for example, and have NFC modules housed therein. That is, the first information terminal 30 and the second information terminal 40 are also capable of short-range wireless communication using the NFC modules.

A registration card 20 is an NFC function-mounted card that is distributed to a purchasing user when the storage battery pack 10 is first purchased, for example. An NFC module having a user ID written therein is housed in the registration card 20. The user ID written in the NFC module is not able to be altered or erased. It should be noted that the registration card 20 is one way of assigning a user ID to a user, and is not essential.

Here, in the case where the first information terminal 30 is to be registered in registration information, the user holds the registration card 20 up to the storage battery pack 10 as depicted in FIG. 2(a). Thereupon, the user ID written in the NFC module in the registration card 20 is transmitted to the storage battery pack 10 by means of short-range wireless communication, and the transmitted user ID is stored in a storage device within the storage battery pack 10.

Meanwhile, the user ID is also written on the front surface of the registration card 20 with characters. In the case where the first information terminal 30 is to be registered in the registration information, the user refers to the user ID written on the registration card 20 and inputs the user ID to the information terminal. The user then holds the first information terminal 30 up to the storage battery pack 10 as depicted in FIG. 2(b). Short-range wireless communication using the NFC modules is thereby performed between the first information terminal 30 and the storage battery pack 10, and the first information terminal 30 is registered in the registration information within the storage battery pack 10.

Furthermore, in the registration system 100, it is also possible for a plurality of information terminals to be registered in one storage battery pack 10. For example, it is also possible for the second information terminal 40 to be additionally registered. Similarly, also in the case where the second information terminal 40 is to be registered, the user may hold the second information terminal 40 up to the storage battery pack 10.

By being registered in the registration information, the first information terminal 30 and the second information terminal 40 obtain the privilege to acquire information relating to the storage battery pack 10. By being registered in the registration information, the first information terminal 30 and the second information terminal 40 may acquire the privilege to control the storage battery pack 10. Furthermore, in embodiment 1, the privileges acquired by the first information terminal 30 and the second information terminal 40 by being registered include: a high-level privilege with which it is possible to alter the registration information; and a low-level privilege with which the registration information cannot be altered but it is possible to acquire information from the storage battery pack 10. The low-level privilege may include a privilege with which it is possible to control the storage battery pack 10, control an electrical device onto which the storage battery pack 10 is mounted, and so forth. Furthermore, the high-level privilege may include the low-level privilege. An information terminal that has the high-level privilege is also described as a first type of information terminal, and an information terminal that has the low-level privilege is also described as a second type of information terminal. Here, the acquisition of the registration information by the second type of information terminal may be permitted.

It should be noted that, for example, at least one of information indicating the state of the storage battery pack 10 and information relating to the electrical device onto which the storage battery pack 10 is mounted is given as an example of the information relating to the storage battery pack 10 that can be acquired from the storage battery pack 10 by the first type of information terminal and the second type of information terminal.

Possible examples of information indicating the state of the storage battery pack 10 include the amount of charge of the storage battery pack 10, the temperature of the storage battery pack 10, information indicating an abnormality of the storage battery pack 10, and the lifespan of the storage battery pack 10.

Examples of information relating to the electrical device onto which the storage battery pack 10 is mounted include the name and model number of the electrical device. Furthermore, information relating to the functions of the electrical device may also be included in the information relating to the electrical device onto which the storage battery pack 10 is mounted. For example, when the storage battery pack 10 is mounted onto an electric bicycle, the speed, travel distance, and so forth of the electric bicycle may also be included in the information relating to the electrical device onto which the storage battery pack 10 is mounted. The information relating to the electrical device onto which the storage battery pack 10 is mounted is, for example, transmitted to the storage battery pack 10 from the electrical device via a communication terminal in the storage battery pack 10, but may be transmitted by means of wireless communication such as NFC.

It should be noted that, when the first information terminal 30 is registered, a dedicated application that is downloaded to the first information terminal 30 is used. For example, by launching the dedicated application, an input screen or the like for the user ID is displayed on a display device of the first information terminal 30.

It should be noted that the method for registering the first information terminal 30 is not limited to a method that uses a dedicated application, and another type of method may be used. For example, the first information terminal 30 may be registered by the first information terminal 30 accessing a specific URL by means of a browser.

Furthermore, it is assumed that the operation performed by the user for the aforementioned registration is performed not only by the user but also by a salesperson or the like of the storage battery pack 10.

[Configuration of Storage Battery Pack and Information Terminal]

Figure 3:
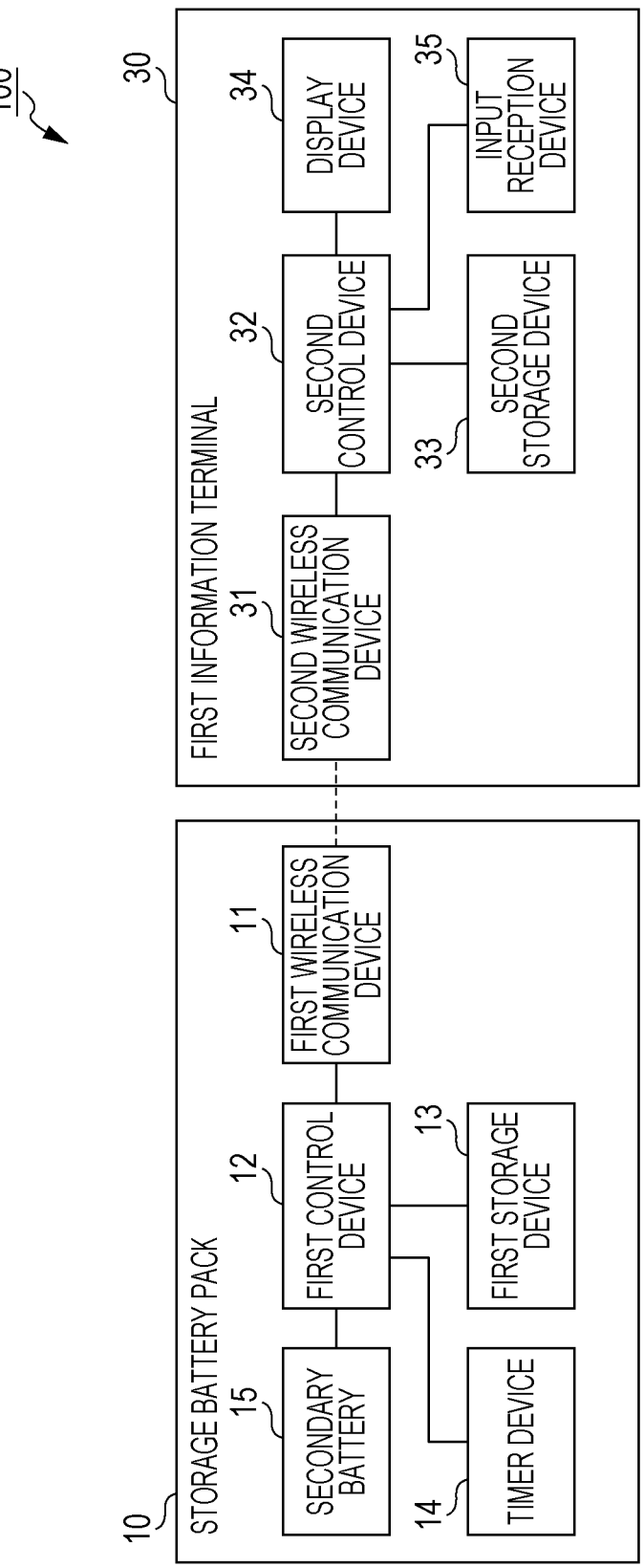
FIG. 3 is a block diagram depicting the configuration of a storage battery pack and a first information terminal.

Next, the specific configuration of the storage battery pack 10 and the first information terminal 30 will be described. FIG. 3 is a block diagram depicting the configuration of the storage battery pack 10 and the first information terminal 30. It should be noted that the second information terminal 40 has the same configuration as the first information terminal 30, and therefore is not depicted in FIG. 3 and a description thereof has been omitted.

First, the storage battery pack 10 will be described. As depicted in FIG. 3, the storage battery pack 10 is provided with a first wireless communication device 11, a first control device 12, a first storage device 13, a timer device 14, and a secondary battery 15.

The storage battery pack 10 is detachably connected to an electrical device, and is used as a direct-current power source for the electrical device. The electrical device to which the storage battery pack 10 is connected is an electric vehicle, for example, but is not particularly limited thereto. A possible example of the electric vehicle is an electric bicycle. Furthermore, the storage battery pack 10 may be standardized so as to be able to be connected to a plurality of types of devices having different functions or uses.

The first wireless communication device 11 is a communication module for short-range wireless communication housed inside the storage battery pack 10, and, specifically, is an NFC module. In embodiment 1, the first wireless communication device 11 is an NFC module that includes a control device having at least one of a reader function and a writer function. It should be noted that the first wireless communication device 11 may be an NFC module not having a reader function or a writer function, and in this case, a second wireless communication device that is described later on may be an NFC module having at least one of a reader function and a writer function. An NFC module not having a reader function or a writer function is an NFC tag, for example. Furthermore, the first wireless communication device 11 may be an RFID module conforming with another wireless communication standard.

The first control device 12 is a control device that performs a variety of control such as control of the charging and discharging of the secondary battery 15, control of the first wireless communication device 11, control of the timer device 14, and writing and reading of information with the first storage device 13. The first control device 12 may have a control function, and, for example, is provided with a computation processing unit (not depicted) and a storage unit (not depicted) that stores a control program. Moreover, an MPU or a CPU serves as an example of the computation processing unit. A hard disk or a semiconductor memory serves as an example of the storage unit. The first control device 12 may be constituted by an individual control device that performs centralized control, or may be constituted by a plurality of control devices that cooperate with each other to perform distributed control.

The first storage device 13 is a storage device having stored therein registration information registered by an information terminal that is able to acquire information relating to the storage battery pack 10. It should be noted that the first storage device 13, in addition, may have stored therein a user ID and information indicating the state of the storage battery pack 10. The first storage device 13, for example, may be any type of storage device such as a semiconductor memory. Moreover, the first storage device 13 is provided separately from the first control device 12, but may be included in a storage unit provided in the first control device 12. Furthermore, the first storage device 13 is provided inside the storage battery pack 10 in the present example, but may be provided outside of the storage battery pack 10. The first storage device 13 may be provided in a server device, for example.

The timer device 14 is an element that measures time, and specifically, is realized by a microcomputer or a dedicated circuit or the like. It should be noted that the timer device 14 is not an essential constituent element.

The secondary battery 15 is configured by a plurality of single batteries being connected in parallel or in series. A single battery is a cell in other words, and specifically is a lithium-ion battery or a nickel-hydrogen battery or the like, but is not particularly limited provided it is a battery capable of charging and discharging.

Next, the first information terminal 30 will be described. As depicted in FIG. 3, the first information terminal 30 is provided with a second wireless communication device 31, a second control device 32, a second storage device 33, a display device 34, and an input reception device 35.

The first information terminal 30, specifically, is an information terminal such as a smartphone or a tablet terminal.

The second wireless communication device 31 is a wireless communication device that is able to communicate with the first wireless communication device 11, and is a communication module for performing short-range wireless communication with the first wireless communication device 11. In embodiment 1, the second wireless communication device 31 is an NFC module. The second wireless communication device 31 may be an NFC module that includes a control device having at least one of a reader function and a writer function, and may be an NFC module not having a reader function or a writer function. Furthermore, the second wireless communication device 31 is a wireless communication device that is able to communicate with the first wireless communication device 11, and it is sufficient as long as short-range wireless communication is possible with the first wireless communication device 11. For example, if the first wireless communication device 11 is an RFID module conforming with another wireless communication standard, it is desirable that the second wireless communication device 31 be the same kind of RFID module that is able to communicate with the aforementioned RFID module.

The second control device 32 performs a variety of control such as control of the second wireless communication device 31 and display control of images for the display device 34. The second control device 32 may have a control function, and, for example, is provided with a computation processing unit (not depicted) and a storage unit (not depicted) that stores a control program. Moreover, an MPU or a CPU serves as an example of the computation processing unit. A hard disk or a semiconductor memory serves as an example of the storage unit. The second control device 32 may be constituted by an individual control device that performs centralized control, or may be constituted by a plurality of control devices that cooperate with each other to perform distributed control.

The second storage device 33 is a storage device having stored therein a dedicated application used for registration, or the like. The second storage device 33, for example, may be any type of storage device such as a semiconductor memory. It should be noted that the second storage device 33 may be included in a storage device provided in the second control device 32, and is not an essential constituent element.

The display device 34 is a display device that is constituted by a liquid crystal panel or an organic EL panel or the like, and displays video and still images, for example. Moreover, the display device 34 may be provided with a touch panel and function as an input interface for the user to give instructions to the first information terminal 30.

The input reception device 35 is an input interface that receives user input such as input of the user ID written in the registration card 20. The input reception device 35, specifically, is a touch panel superimposed on the display device 34, but may be constituted by hardware buttons. The input reception device 35 makes up a graphical user interface (GUI) together with the display device 34.

[Registration Operation of Information Terminal]

Figures 4, 5:
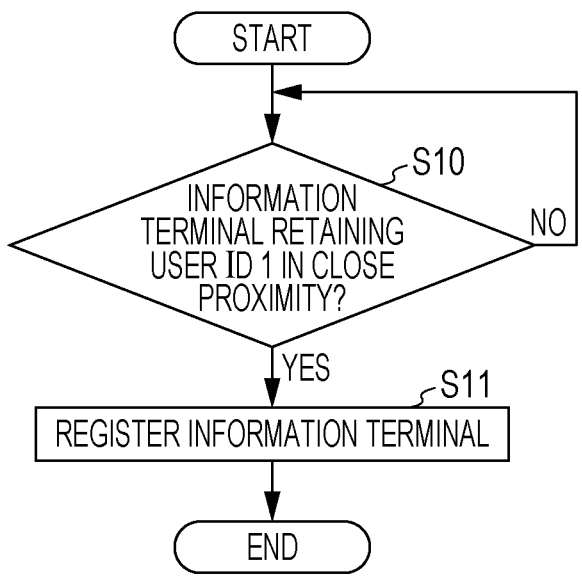
FIG. 4 is a flowchart depicting an overview of a registration operation of a storage battery pack.
FIG. 5 is a drawing depicting an example of registration information.

Next, a description will be given regarding an operation of the storage battery pack 10 (method for controlling the storage battery pack) for the case where the first information terminal 30 is to be registered in the registration information. First, an overview of the operation of the storage battery pack 10 will be described. FIG. 4 is a flowchart depicting an overview of a registration operation of the storage battery pack 10.

The user enters the user ID written on the registration card 20 (hereinafter, this user ID is referred to as user ID 1) to the first information terminal 30, and then brings the first information terminal 30 close to the storage battery pack 10. Here, when the first information terminal 30 comes into close proximity with the first wireless communication device 11 (yes in S10), the first control device 12 registers the first information terminal 30 as a first type of information terminal in the registration information registered in the first storage device 13 inside the storage battery pack 10 (S11). It should be noted that close proximity here refers to the first information terminal 30 coming close up to a range in which the second wireless communication device 31 of the first information terminal 30 is able to communicate with the first wireless communication device 11.

Here, as described above, the first information terminal 30 is provided with the second wireless communication device 31 that is able to communicate with the first wireless communication device 11, and retains the user ID 1 that indicates the user of the storage battery pack 10. The user ID 1 is an example of first identification information.

Furthermore, the aforementioned first type of information terminal is an information terminal that is able to alter the registration information, and is able to acquire information provided from the storage battery pack 10. Furthermore, a second type of information terminal having a lower level of privilege than the first type of information terminal is also registered in the registration information. The second type of information terminal is an information terminal that is not able to alter the registration information, and is able to acquire, from the storage battery pack 10, other information relating to the storage battery pack 10 that is different from the registration information.

In this way, a first type of information terminal and a second type of information terminal, namely information terminals that are able to acquire information provided from the storage battery pack 10, are registered in the registration information. FIG. 5 is a drawing depicting an example of registration information. As depicted in FIG. 5, terminal IDs and terminal types are associated in the registration information. It should be noted that the terminal IDs are IDs that are different from the aforementioned user ID and are for individually specifying information terminals, and any type of ID may be used such as the MAC address of an information terminal and an ID that is allocated when an information terminal performs wireless communication.

Figure 6:
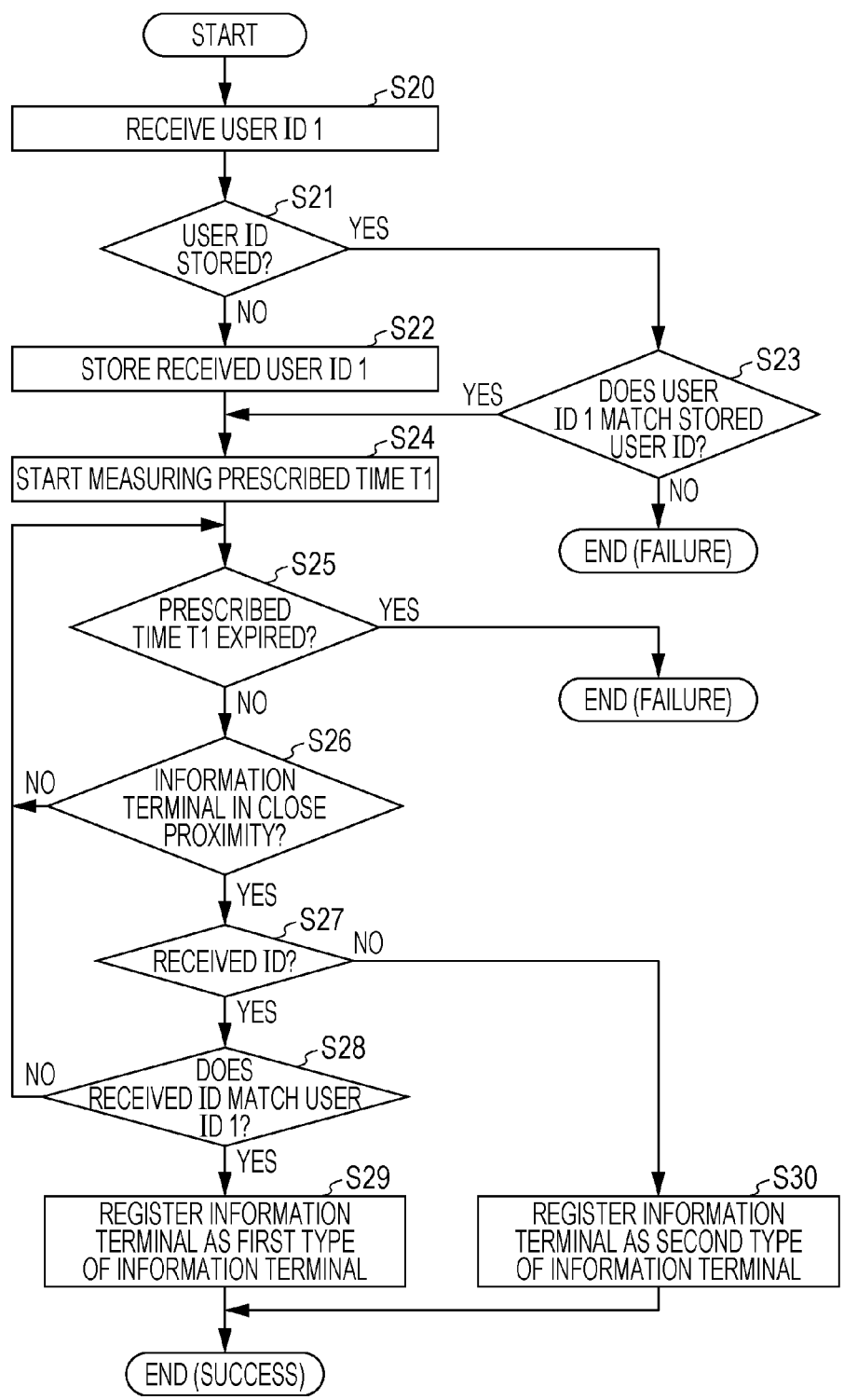
FIG. 6 is a flowchart depicting details of the registration operation of the storage battery pack.

Next, a description will be given regarding a detailed operation of the storage battery pack 10 for the case where an information terminal such as the first information terminal 30 is to be registered in the registration information. FIG. 6 is a flowchart depicting the details of a registration operation of the storage battery pack 10.

First, a description will be given regarding steps S20 to S23 that constitute processing for causing the user ID 1, which is stored in the registration card 20, to be stored in the storage battery pack 10.

First, the first wireless communication device 11 receives the user ID 1 from the registration card 20 (S20). Specifically, the first wireless communication device 11 of the storage battery pack 10 transmits a detection signal (magnetic field) in advance. At such time, when the user brings the registration card 20 close to the storage battery pack 10, a coil inside the registration card 20 receives magnetism and generates a current, and the NFC module within the registration card 20 activates due to the current. The NFC module within the registration card 20 then transmits the user ID 1 stored in said NFC module to the first wireless communication device 11, and the first wireless communication device 11 receives the user ID 1 transmitted from the registration card 20.

Next, the first control device 12 determines whether or not a user ID is stored in the first storage device 13 (S21). In the case where a user ID is not stored in the first storage device 13 (no in S21), the first control device 12 stores the received user ID 1 in the first storage device 13 (S22), and the processing of step S24 is performed.

However, in the case where a user ID is stored in the first storage device 13 (yes in S21), the first control device 12 determines whether or not the user ID 1 matches the user ID stored in the first storage device 13 (S23). In the case where the user ID 1 matches the user ID stored in the first storage device 13 (yes in S23), the processing of step S24 is performed, and in the case where the user ID 1 does not match the user ID stored in the first storage device 13 (no in S23), it is determined that registration has failed and the processing ends.

The processing of steps S20 to S23 described above constitutes a trigger for performing the information terminal registration processing of step S24 and thereafter. That is, when a user ID is stored in the first storage device 13, if the user does not bring the registration card 20 retaining said user ID close to the storage battery pack 10, it is not possible to start the processing of step S24 and thereafter to newly register an information terminal.

It should be noted that, in step S20, the first wireless communication device 11 may receive the user ID 1 from an information terminal that retains the user ID 1, instead of from the registration card 20. In other words, the user is able to cause the processing of step S24 and thereafter to start also by bringing an information terminal retaining the user ID 1 stored in the first storage device 13 close to the storage battery pack 10. That is, the user is also able to use an information terminal retaining the user ID 1 instead of the registration card 20. It should be noted that the processing of steps S20 to S23 is not essential.

Next, the processing of step S24 and thereafter will be described. It should be noted that, in the description of FIG. 6 hereinafter, it is assumed that the user ID 1 is stored in the first storage device 13.

First, the first control device 12 activates the timer device 14 to start measuring a prescribed time T1 (S24), and determines whether or not the prescribed time T1 has expired (S25). In the case where the prescribed time T1 has expired (yes in S25), it is determined that registration has failed and the processing ends.

If the prescribed time T1 has not expired (no in S25), the first control device 12 determines whether or not an information terminal is in close proximity (S26). The first wireless communication device 11, for example, during the prescribed time T1, transmits a detection signal for detecting the close proximity of an information terminal, and determines that an information terminal is in close proximity when a response to the detection signal is received. It should be noted that the first wireless communication device 11 may be on standby during the prescribed time T1 and determine that an information terminal is in close proximity when a signal is received from an information terminal while on standby. That is, signal transmission may be started from the information terminal side; for example, in the case where the first wireless communication device 11 is an NFC module not having a reader function or a writer function, signal transmission may be started from the second wireless communication device 31.

If it is determined that an information terminal is not in close proximity (no in S26), the first control device 12 performs the determination processing of step S25 as to whether or not the prescribed time T1 has expired. If it is determined that an information terminal is in close proximity (yes in S26), the first control device 12 determines whether or not an ID has been received from the information terminal that is in close proximity (S27). It should be noted that the ID may be included in a response to the aforementioned detection signal or a signal received during standby, and may be transmitted from the information terminal as a separate signal.

If it is determined that a user ID has been received from an information terminal that is in close proximity (yes in S27), the first control device 12 determines whether or not the received user ID matches the user ID 1 (S28). That is, the first control device 12 performs a user ID comparison.

If the received user ID matches the user ID 1 (yes in S28), the first control device 12 registers the information terminal in the registration information within the first storage device 13 as a first type of information terminal (S29). It should be noted that, although not depicted in FIG. 6, a terminal ID used for registration is transmitted from the information terminal prior to registration, and is received by the second wireless communication device 31. The terminal ID may be transmitted together with the user ID, or may be transmitted separately from the user ID. If the received user ID does not match the user ID 1 (no in S28), the first control device 12 performs the determination processing of step S25 as to whether or not the prescribed time T1 has expired.

On the other hand, if it is determined in step S27 that an ID has not been received from the information terminal that has come into close proximity (no in S27), the first control device 12 registers the information terminal in the registration information within the first storage device 13 as a second type of information terminal (S30). It should be noted that, when registration has been completed, the storage battery pack 10 may output a buzzer sound or the like in order to notify the user that registration has been completed. In this case, the storage battery pack 10 is provided with a sound output device.

Owing to the operation of the storage battery pack 10 as described above, the user is able to register an information terminal in the registration information. It should be noted that, if within the prescribed time T1, the user is also able to continuously register a plurality of information terminals. Moreover, the prescribed time T1 is an arbitrary value that is set as appropriate. The prescribed time T1, for example, may be set as a time-out time for preventing step S26 being executed by a third party unrelated to the user who executed step S20 and an information terminal of the third party being registered as a first type of information terminal or a second type of information terminal.

Figure 7A:
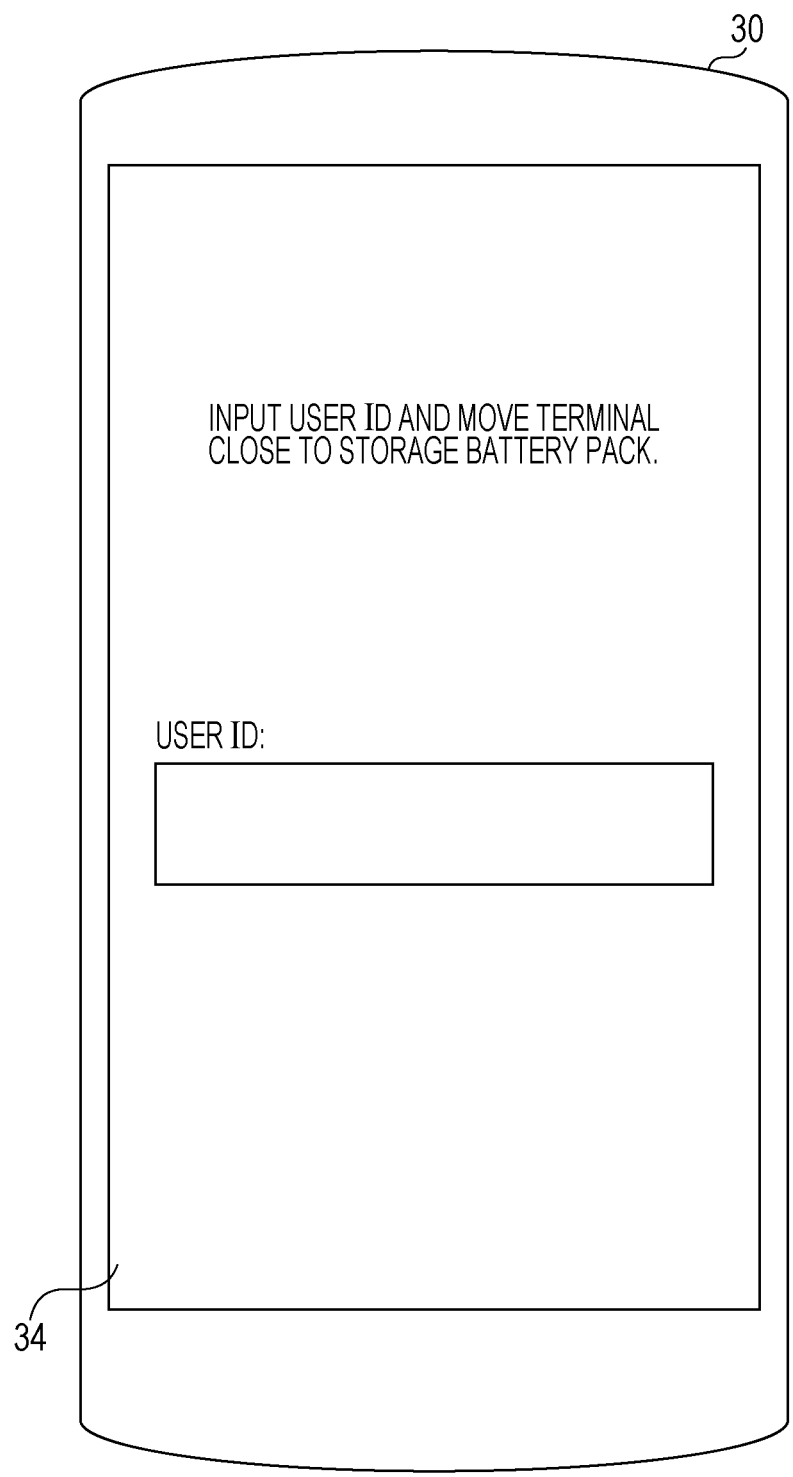
FIG. 7A is a first drawing for describing an example of a display screen that is displayed on an information terminal.
Figure 7C:
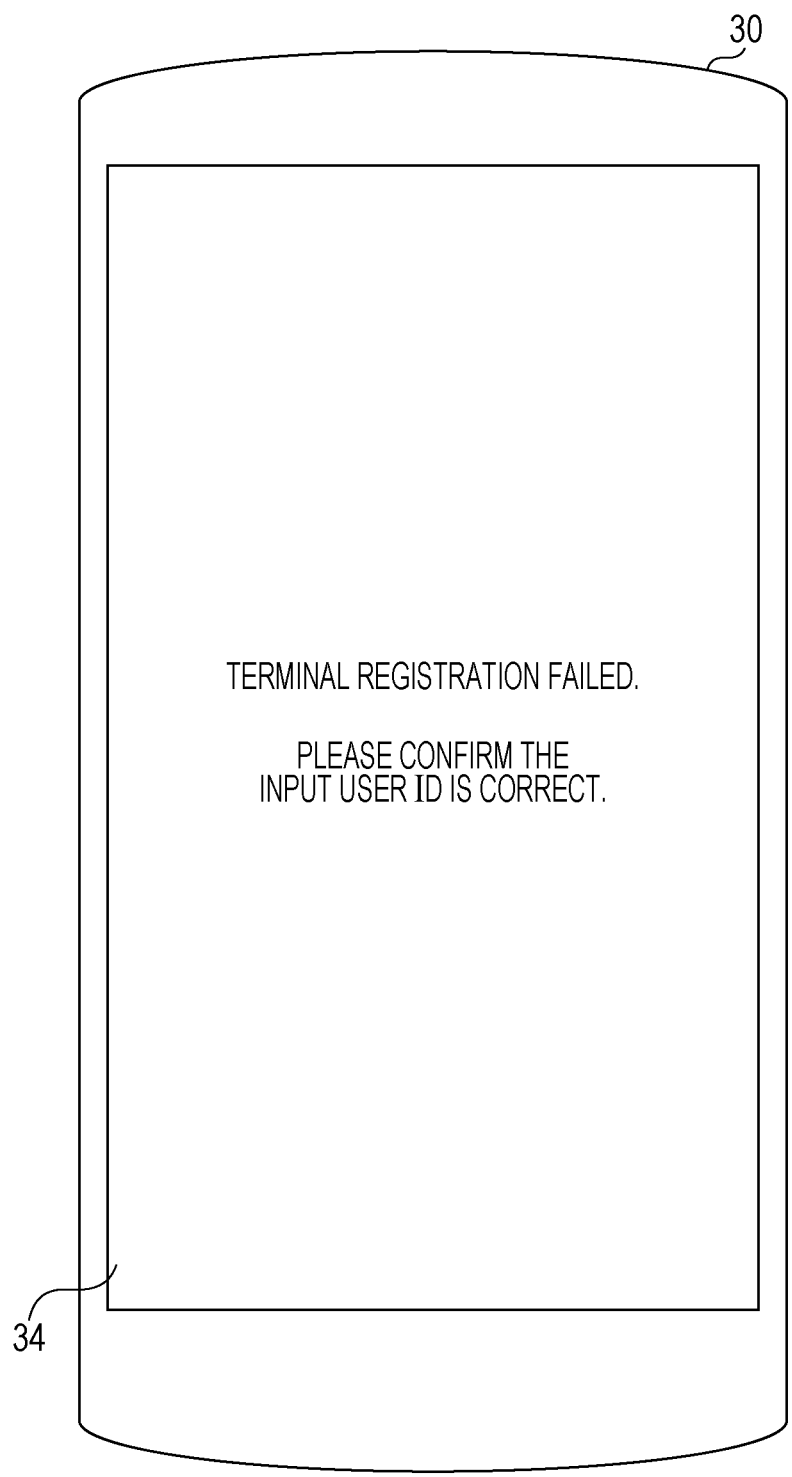
FIG. 7C is a third drawing for describing an example of a display screen that is displayed on an information terminal.

It should be noted that, as described above, when an information terminal is to be registered, a dedicated application is executed in the information terminal. A description will be given regarding an example of a display screen that is displayed on the information terminal due to the dedicated application being executed. FIGS. 7A to 7C are drawings for describing examples of display screens that are displayed on the information terminal.

When the user registers the first information terminal 30 in the storage battery pack 10, upon the dedicated application being launched, a user ID input screen such as that displayed in FIG. 7A is displayed on the display device 34, for example. The input reception device 35 receives a user ID that has been input to the input screen, and the second control device 32 causes a signal that includes the user ID to be transmitted to the second wireless communication device 31. Due to the transmitted signal being received by the first wireless communication device 11, in the aforementioned step S27, the second control device 32 determines that the user ID has been received from an information terminal that has come into close proximity.

Then, when the processing of the aforementioned step S29 or step S30 has been performed and registration has been completed, an image such as that depicted in FIG. 7B that notifies the completion of registration is displayed on the display device 34. On the other hand, if registration fails, an image such as that depicted in FIG. 7C notifying registration failure is displayed on the display device 34. It should be noted that these images are displayed upon the second wireless communication device 31 receiving a signal indicating registration completion or a signal indicating registration failure from the first wireless communication device 11.

[Acquisition of Registration Information and Acquisition of Information Indicating State of Storage Battery Pack]

An information terminal that has been registered as a first type of information terminal in the registration information is able to acquire and alter registration information. Hereinafter, a description will be given regarding the content of registration information acquisition and alteration processing for the case where the first information terminal 30 has been registered as a first type of information terminal. FIG.

Figure 9A:
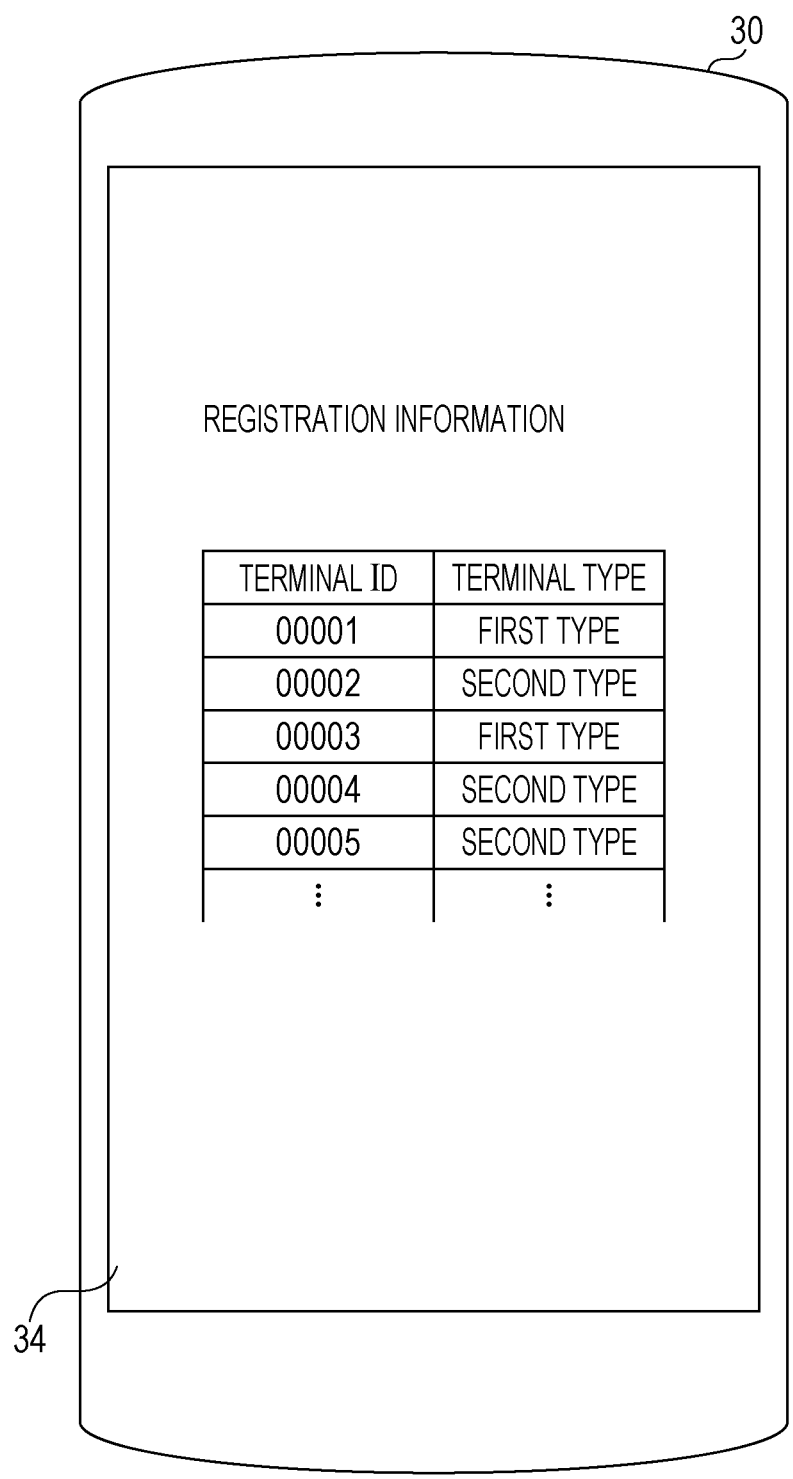
FIG. 9A is a drawing depicting an example of a display screen in the acquisition of registration information.
Figure 9B:
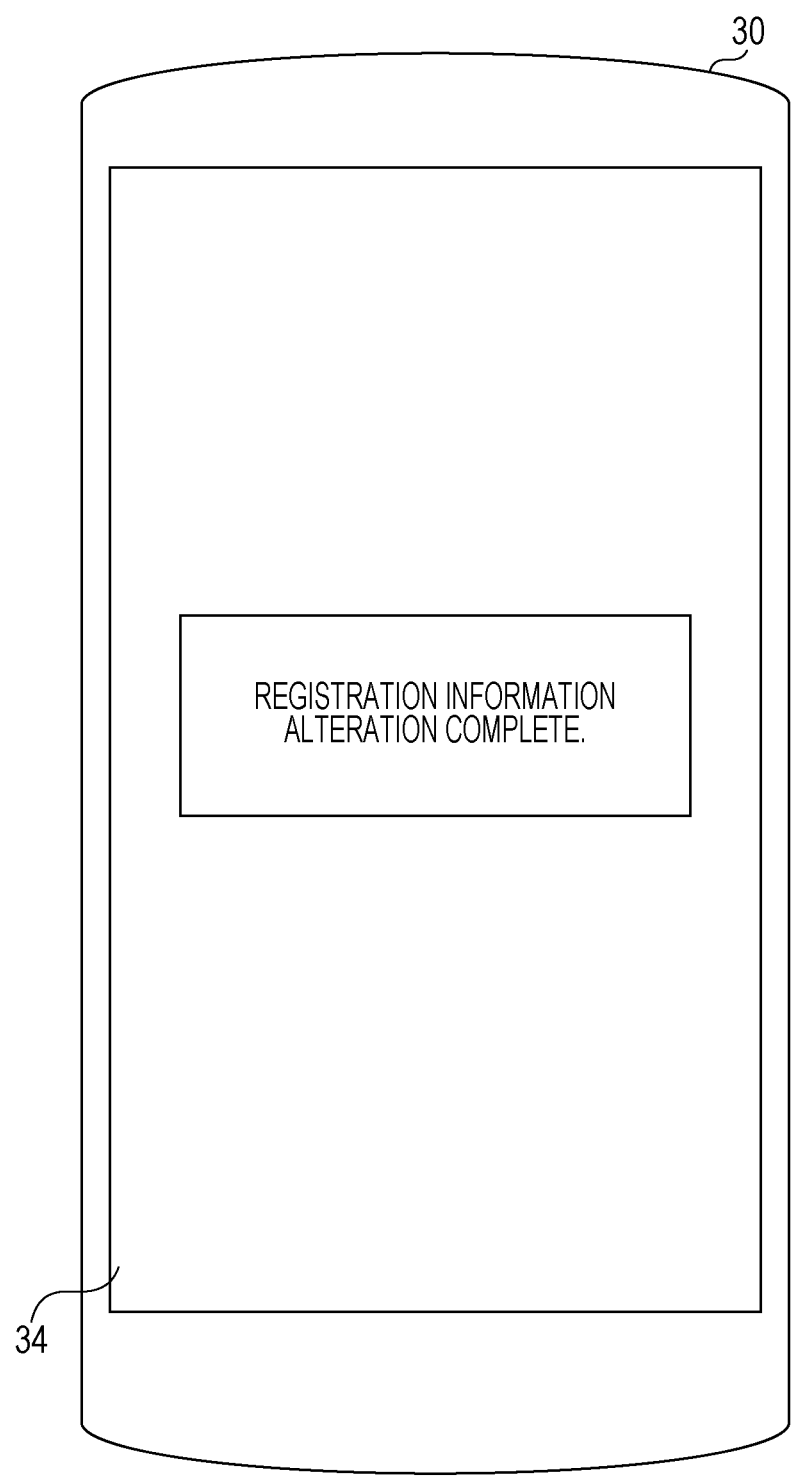
FIG. 9B is a drawing depicting an example of a display screen in the alteration of registration information.

8 is a sequence diagram of registration information acquisition and alteration processing. FIGS. 9A and 9B are drawings depicting examples of display screens in the acquisition and alteration of registration information.

As depicted in FIG. 8, the input reception device 35 receives user input requesting registration information (S100). The second control device 32 uses the second wireless communication device 31 to transmit the request for registration information in accordance with the input received by the input reception device 35 (S101). The request for registration information includes the terminal ID of the first information terminal 30.

The transmitted request for registration information is received by the first wireless communication device 11 (S200), and the first control device 12 refers to the registration information to thereby confirm that the terminal ID included in the received request is registered as a first type of information terminal (S201). The first control device 12 then reads the registration information from the first storage device 13 in accordance with the received request, and uses the first wireless communication device 11 to transmit the read registration information to the first information terminal 30 (S202).

The second control device 32 receives the transmitted registration information using the second wireless communication device 31 (S102), and causes the received registration information to be displayed on the display device 34 as depicted in FIG. 9A (S103).

In addition, if the input reception device 35 receives user input for altering the registration information (S104), the first control device 12 uses the second wireless communication device 31 to transmit an instruction to alter the registration information, in accordance with the input received by the input reception device 35 (S105).

The transmitted instruction to alter the registration information is received by the first wireless communication device 11 (S203), and the first control device 12 alters the registration information within the first storage device 13 in accordance with the received request (S204). The first control device 12 then uses the first wireless communication device 11 to notify the first information terminal 30 that the alteration has been completed (S205).

The second control device 32 receives the notification using the second wireless communication device 31 (S106), and an image indicating that the alteration has been completed is displayed on the display device 34 as depicted in FIG. 9B (S107).

Figure 11:
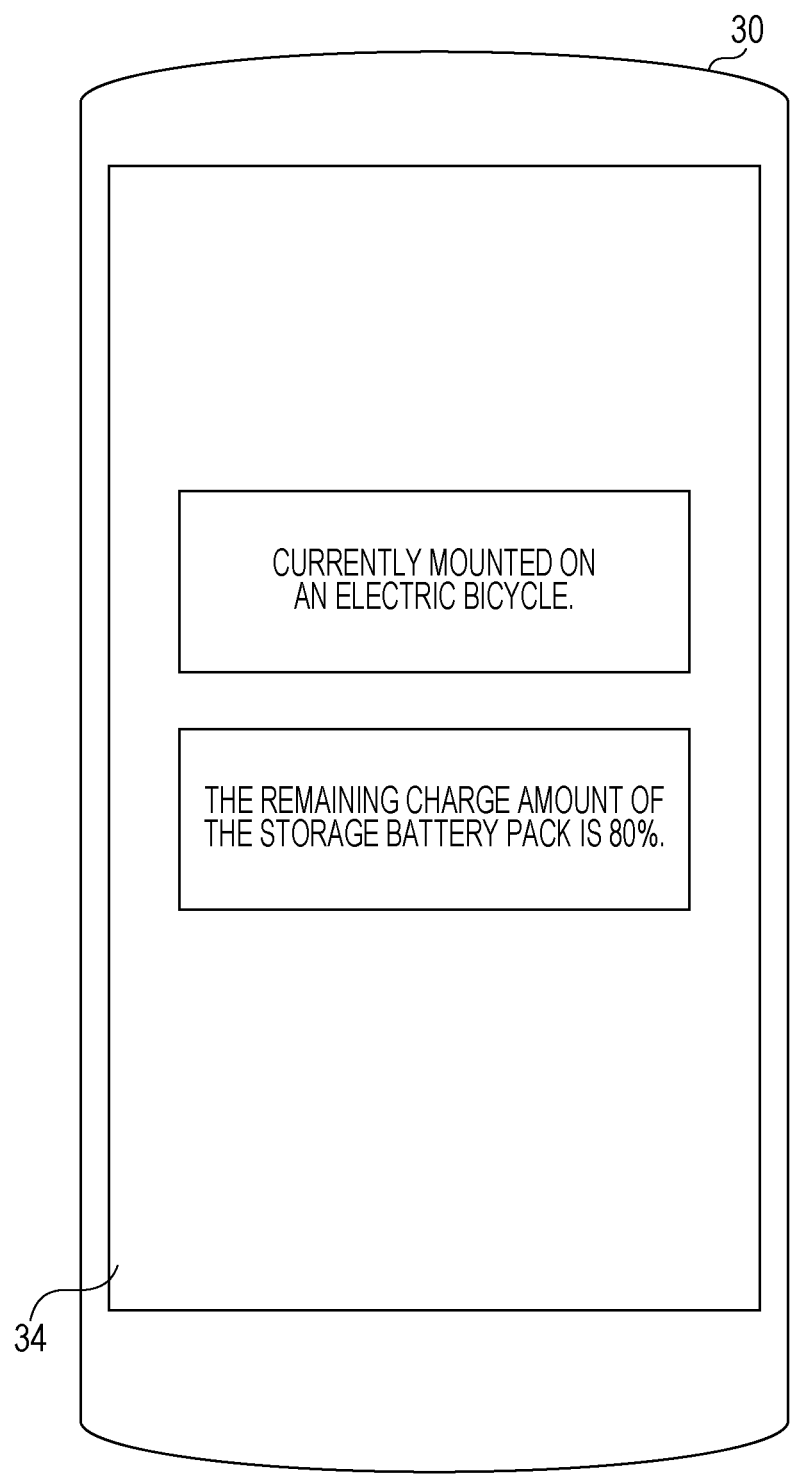
FIG. 11 is a drawing depicting an example of a display screen in the acquisition of information indicating the state of a storage battery pack.

Meanwhile, an information terminal registered as a first type of information terminal in the registration information and an information terminal registered as a second type of information terminal in the registration information are able to acquire information indicating the state of the storage battery pack 10. FIG. 10 is a sequence diagram of acquisition processing for information indicating the state of the storage battery pack 10. FIG. 11 is a drawing depicting an example of a display screen in the acquisition of information indicating the state of the storage battery pack 10.

As depicted in FIG. 10, the input reception device 35 receives user input requesting information indicating the state of the storage battery pack 10 (S110). The second control device 32 uses the second wireless communication device 31 to transmit a request for information indicating the state of the storage battery pack 10, in accordance with the input received by the input reception device 35 (S111). The request for information indicating the state of the storage battery pack 10 includes the terminal ID of the first information terminal 30.

The transmitted request for information indicating the state of the storage battery pack 10 is received by the first wireless communication device 11 (S210). The first control device 12 refers to the registration information to thereby confirm that the terminal ID included in the received request is registered (S211). The first control device 12 then reads the information indicating the state of the storage battery pack 10 from the first storage device 13 in accordance with the received request, and uses the first wireless communication device 11 to transmit the read information indicating the state of the storage battery pack 10 to the first information terminal 30 (S212).

The second control device 32 receives the transmitted information indicating the state of the storage battery pack 10 using the second wireless communication device 31 (S112), and, as depicted in FIG. 11, causes the received information indicating the state of the storage battery pack 10 to be displayed on the display device 34 (S113). In FIG. 11, the remaining amount of charge is displayed on the display device 34, as an example of the information indicating the state of the storage battery pack 10. Furthermore, the same processing as that of FIG. 10 is performed also in the case where the input reception device 35 has received user input requesting information relating to the electrical device onto which the storage battery pack 10 is mounted. In this case, as depicted in FIG. 11, the name or the like of the electrical device onto which the storage battery pack 10 is mounted is displayed on the display device 34.

[Effects Etc.]

As described above, in the case where the user wishes to register the first information terminal 30 as a first type of information terminal, it is sufficient for the user to input the user ID 1 to the first information terminal 30 and move close to the storage battery pack 10. At such time, when the first information terminal 30 retaining the user ID 1 indicating the user of the storage battery pack 10 comes into close proximity with the first wireless communication device 11, the first control device 12 of the storage battery pack 10 registers the first information terminal 30 in registration information as a first type of information terminal capable of altering the registration information, the registration information being stored in the first storage device 13 provided inside or outside of the storage battery pack 10 and being of information terminals capable of acquiring information relating to the storage battery pack 10. This kind of processing is exemplified in FIGS. 4 and 6.

The user is thereby able to easily register the first information terminal 30 as a first type of information terminal by inputting the user ID 1 to the first information terminal 30 and moving close to the storage battery pack 10.

It should be noted that the first type of information terminal, to give more detail, is an information terminal that is able to alter the registration information and is able to acquire information relating to the storage battery pack 10 from the storage battery pack 10.

Consequently, the user is able to acquire registration information and other information relating to the storage battery pack 10 besides the registration information, via the first information terminal 30 that is registered as a first type of information terminal.

Furthermore, the aforementioned information relating to the storage battery pack 10, specifically, is information indicating the state of the storage battery pack 10 or information relating to the electrical device onto which the storage battery pack 10 is mounted, for example.

The user is thereby able to acquire information indicating the state of the storage battery pack 10 or information relating to the electrical device onto which the storage battery pack 10 is mounted, via the first information terminal 30 that is registered as a first type of information terminal.

Furthermore, the storage battery pack 10, upon receiving an instruction to alter the registration information from the first information terminal 30, alters the content of the registration information. This kind of processing is exemplified in FIG. 8.

The user is thereby able to alter the registration information via the first information terminal 30.

Furthermore, in the case where it is desired for the second information terminal 40 to be additionally registered as a second type of information terminal, first, the user brings the registration card 20 or the first information terminal 30, to which the user ID 1 has been input, close to the storage battery pack 10. Thereafter, it is sufficient for the user to bring the second information terminal 40, to which the user ID has not been input, close to the storage battery pack 10 within the prescribed time T1.

At such time, the first wireless communication device 11 receives the user ID 1, and, when the second information terminal 40 not retaining the user ID 1 comes into close proximity with the first wireless communication device 11 within the prescribed time T1 from after the first wireless communication device 11 has received the user ID 1, the first control device 12 of the storage battery pack 10 registers the second information terminal 40 as a second type of information terminal in the registration information. This kind of processing is exemplified in FIG. 6. Here, the second type of information terminal is an information terminal that is not able to alter the registration information, and is able to acquire, from the storage battery pack 10, other information relating to the storage battery pack 10 that is different from the registration information.

The user is thereby able to easily register the second information terminal 40 as a second type of information terminal by bringing a device retaining the user ID 1 such as the registration card 20 or the first information terminal 30, to which the user ID 1 has been input, close to the storage battery pack 10, and then bringing the second information terminal 40 close to the storage battery pack 10 within the prescribed time T1.

Furthermore, the aforementioned other information relating to the storage battery pack 10, specifically, is information indicating the state of the storage battery pack 10 or information relating to the electrical device onto which the storage battery pack 10 is mounted, for example.

The user is thereby able to acquire information indicating the state of the storage battery pack 10 or information relating to the electrical device onto which the storage battery pack 10 is mounted, via the second information terminal 40 that is registered as a second type of information terminal.

Furthermore, in the case where it is desired for the second information terminal 40 to be additionally registered as a first type of information terminal, first, the user brings the registration card 20 or the first information terminal 30, to which the user ID 1 has been input, close to the storage battery pack 10. Thereafter, it is sufficient for the user to bring the second information terminal 40, to which the user ID 1 has been input, close to the storage battery pack 10 within the prescribed time T1.

At such time, the first wireless communication device 11 receives the user ID 1, and, when the second information terminal 40 retaining the user ID 1 comes into close proximity with the first wireless communication device 11 within the prescribed time from after the user ID 1 has been received, the first control device 12 of the storage battery pack 10 registers the second information terminal 40 as a first type of information terminal in the registration information. This kind of processing is exemplified in FIG. 6. Here, the second information terminal 40 is provided with a wireless communication device that is able to communicate with the first wireless communication device 11.

The user is thereby able to easily register the second information terminal 40 as a first type of information terminal by bringing a device retaining the user ID 1 such as the registration card 20 or the first information terminal 30, to which the user ID 1 has been input, close to the storage battery pack 10, and then bringing the second information terminal 40, to which the user ID 1 has been input, close to the storage battery pack 10 within the prescribed time T1.

It should be noted that, prior to registering the second information terminal 40, the first wireless communication device 11 receives the user ID 1 due to the first information terminal 30 coming into close proximity with the first wireless communication device 11.

The user is thereby able to start registration processing for the second information terminal 40 by bringing the first information terminal 30 into close proximity with the first wireless communication device 11.

Furthermore, prior to registering the second information terminal 40, the first wireless communication device 11 may receive the user ID 1 due to a third information terminal coming into close proximity with the first wireless communication device 11. Here, the third information terminal is provided with a wireless communication device that is able to communicate with the first wireless communication device 11, and retains the user ID 1.

The user is thereby able to start registration processing for the second information terminal 40 by bringing a third information terminal that is different from the first information terminal 30 into close proximity with the first wireless communication device 11.

Furthermore, the first wireless communication device 11 receives the user ID 1 due to an external device coming into close proximity with the first wireless communication device 11, and the external device may be a device that is provided with a wireless communication device capable of communicating with the first wireless communication device 11, and that retains the user ID 1 and is not able to refer to the registration information. Here, an example of the external device is the registration card 20.

The user is thereby able to start registration processing for the second information terminal 40 by bringing the external device retaining the user ID 1 into close proximity with the first wireless communication device 11.

Furthermore, to give more detail, the first control device 12 of the storage battery pack 10 stores a user ID in the first storage device 13 prior to registration, and, when the first information terminal 30 comes into close proximity, acquires the user ID 1 retained by the first information terminal 30, and compares the acquired user ID 1 and the stored user ID. Then, if the acquired user ID 1 and the stored user ID match as a result of the comparison, the first control device 12 registers the first information terminal 30 in the registration information as a first type of information terminal. This kind of processing is exemplified in FIG. 6.

It is thereby possible to suppress the erroneous registration of an information terminal retaining a different user ID from the user ID 1. Furthermore, it is possible to suppress the registration of an information terminal retaining a fake user ID that is not an appropriate user ID.

Furthermore, in the aforementioned storing, to give more detail, the identification information is stored in the storage device due to the external device coming into close proximity with the first wireless communication device 11, and the external device is a device that is provided with a wireless communication device capable of communicating with the first wireless communication device 11, and that retains the user ID 1 and is not able to refer to the registration information. Here, an example of the external device is the registration card 20.

It is thereby possible for the user ID 1 to be stored in the first storage device 13 by the user bringing the external device such as the registration card 20 into close proximity with the storage battery pack 10.

Modified Example 1

Figure 12:
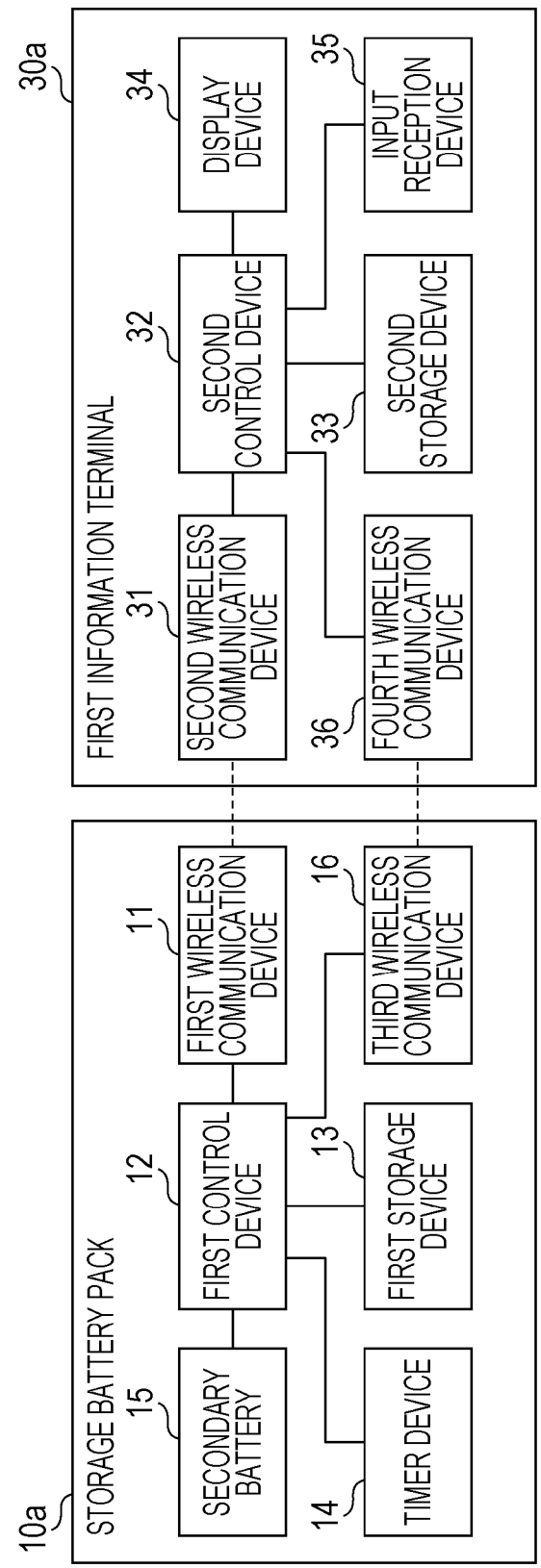
FIG. 12 is a block diagram depicting the configuration of a registration system in which NFC and another form of wireless communication are jointly used.
Figure 13:
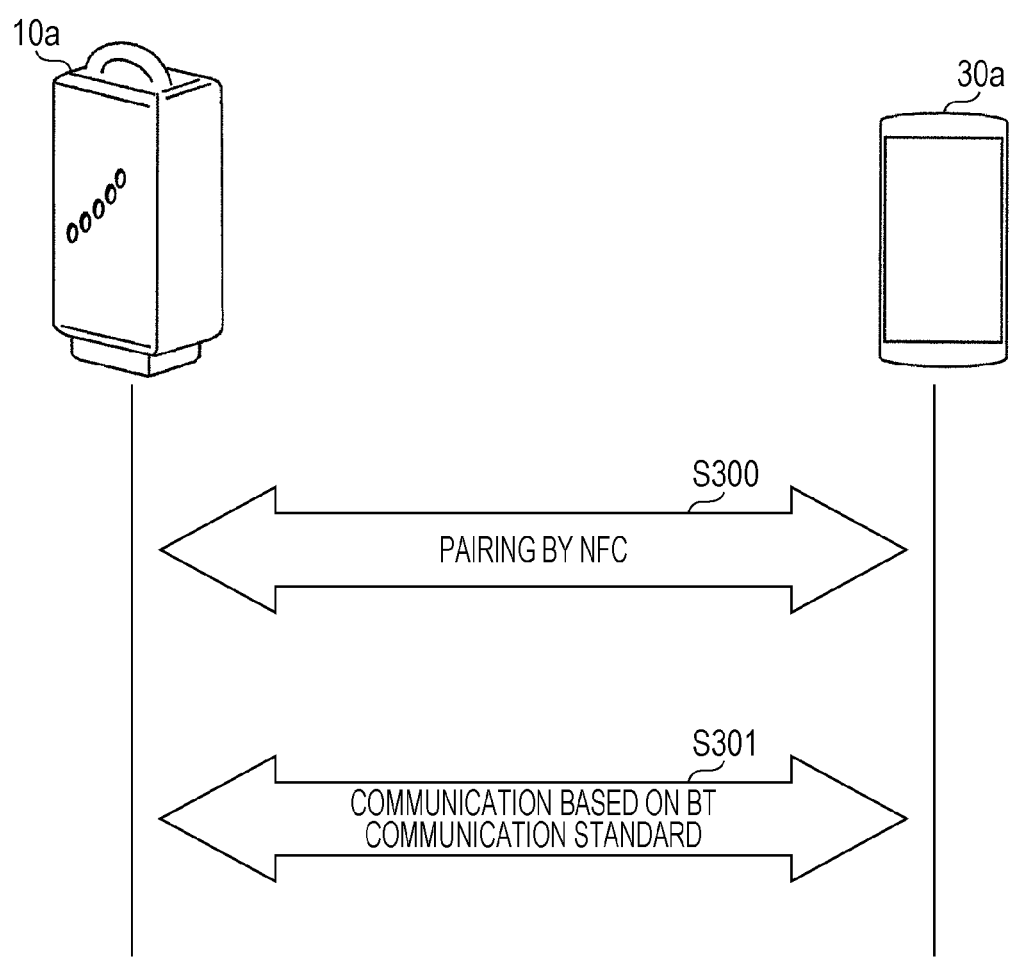
FIG. 13 is a drawing for describing an overview of communication in a registration system in which NFC and another form of wireless communication are jointly used.

In the aforementioned embodiment 1, the communication between the storage battery pack 10 and the first information terminal 30 was performed by means of NFC; however, NFC and another form of wireless communication may be jointly used. Hereinafter, a modified example of this kind will be described. FIG. 12 is a block diagram depicting the configuration of a registration system in which NFC and another form of wireless communication are jointly used. FIG. 13 is a drawing for describing an overview of communication in a registration system in which NFC and another form of wireless communication are jointly used.

A registration system 100a depicted in FIG. 12 is provided with a storage battery pack 10a and a first information terminal 30a. It should be noted that the registration system 100a may be additionally provided with another information terminal.

Different from the storage battery pack 10, the storage battery pack 10a is provided with a third wireless communication device 16.

The third wireless communication device 16, for example, is a communication module (communication circuit) based on the Bluetooth (registered trademark) (hereinafter simply referred to as BT) communication standard. With communication based on the BT communication standard, the communication distance is longer, the amount of information that can be communicated is greater, and the communication speed is faster than NFC. It should be noted that the third wireless communication device 16 may be a communication module corresponding to another communication standard such as ZigBee (registered trademark).

Furthermore, different from the first information terminal 30, the first information terminal 30a is provided with a fourth wireless communication device 36. The fourth wireless communication device 36 is a wireless communication device that is able to communicate with the third wireless communication device 16. That is, if the third wireless communication device 16 is a communication module based on the BT communication standard, the fourth wireless communication device 36 is also a communication module based on the BT communication standard, and if the third wireless communication device 16 is a communication module based on the ZigBee (registered trademark) communication standard, the fourth wireless communication device 36 is also a communication module based on the ZigBee (registered trademark) communication standard.

As depicted in FIG. 13, what is referred to as a handover is performed in the registration system 100a. Specifically, as depicted in FIG. 13, pairing for performing communication based on the BT communication standard is performed using NFC (the first wireless communication device 11 and the second wireless communication device 31) (S300), and thereafter, communication based on the BT communication standard is performed using the third wireless communication device 16 and the fourth wireless communication device 36 (S301).

This kind of registration system 100a may be used, and at least a portion of the processing performed using communication between the first wireless communication device 11 and the second wireless communication device 31 in the aforementioned embodiment 1 may be performed using communication between the third wireless communication device 16 and the fourth wireless communication device 36. For example, the registration of an information terminal may be performed with communication between the first wireless communication device 11 and the second wireless communication device 31, and the acquisition of registration information and the acquisition of information indicating the state of the storage battery pack or the like may be performed with communication between the third wireless communication device 16 and the fourth wireless communication device 36.

Modified Example 2

Figure 14:
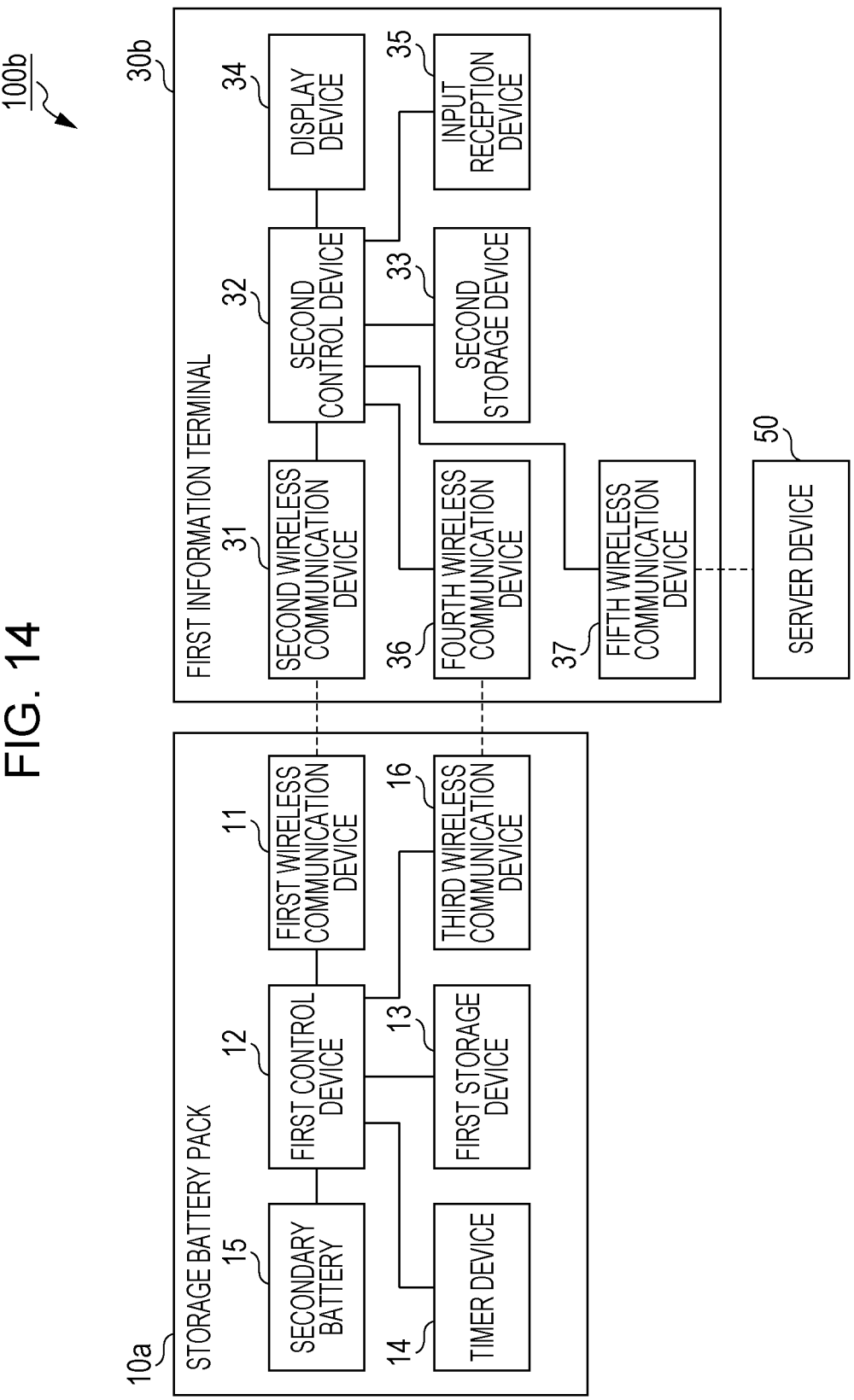
FIG. 14 is a block diagram depicting the configuration of a registration system that includes a server device.
Figure 15:
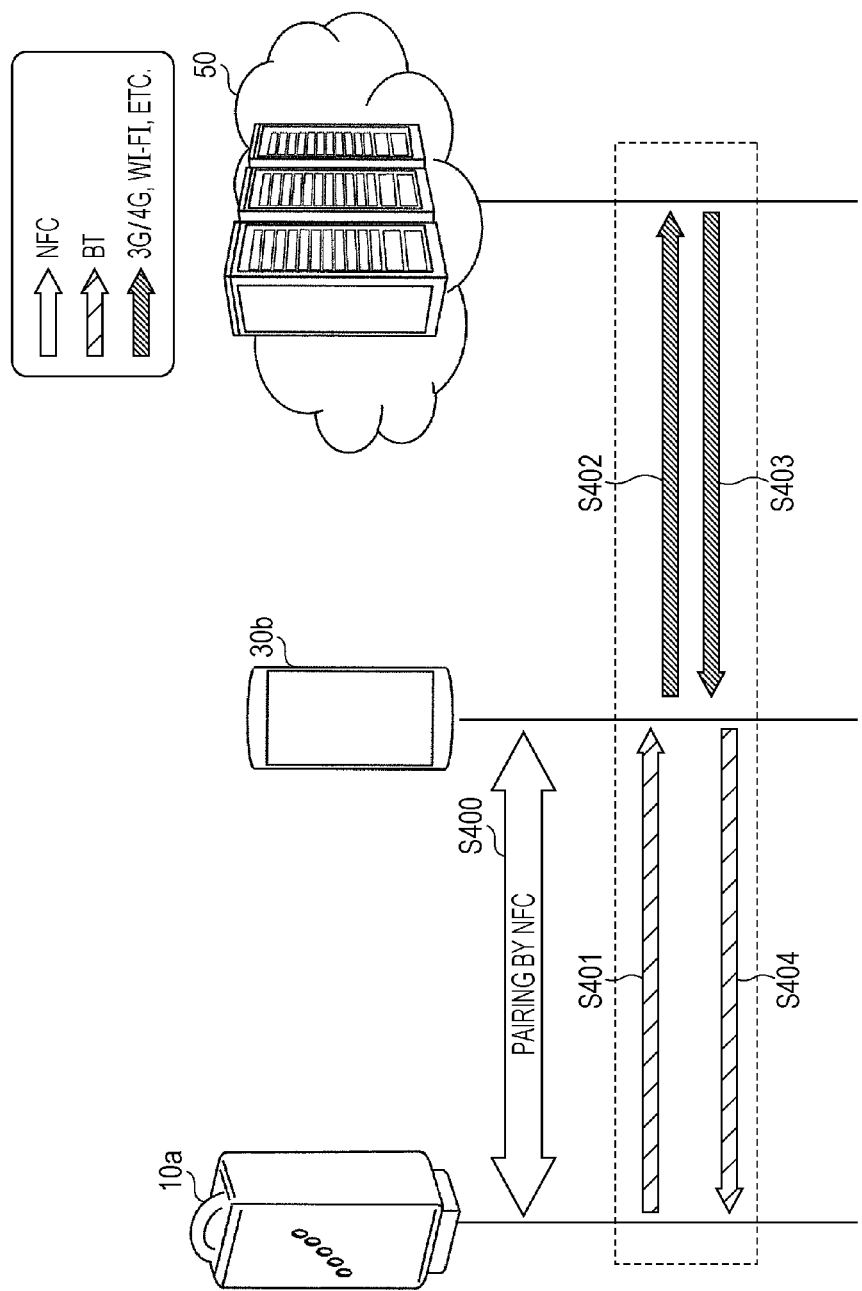
FIG. 15 is a drawing for describing an overview of communication in a registration system that includes a server device.

A server device (cloud server) may be included in the registration system. In the case where the first information terminals 30 and 30a are smartphones or the like, the first information terminals 30 and 30a are additionally provided with a wireless communication device corresponding to a cellular phone function. By using this kind of wireless communication device, communication between the storage battery packs 10 and 10a and a server device is possible. FIG. 14 is a block diagram depicting the configuration of a registration system that includes a server device. FIG. 15 is a drawing for describing an overview of communication in a registration system that includes a server device.

A registration system 100b depicted in FIG. 14 is provided with the storage battery pack 10a and a first information terminal 30b. It should be noted that the registration system 100b may be additionally provided with another information terminal. The storage battery pack 10a has the same configuration as the storage battery pack 10a depicted in FIG. 12.

Furthermore, different from the first information terminal 30a, the first information terminal 30b is provided with a fifth wireless communication device 37. The fifth wireless communication device 37 is a communication module (communication circuit) for wirelessly communicating with a server device 50, and, for example, is a communication module corresponding to what is referred to as 3G or 4G mobile communication. Furthermore, the fifth wireless communication device 37 may be a communication module corresponding to a wireless LAN such as Wi-Fi (registered trademark).

In this kind of registration system 100b, a portion of the processing performed by the storage battery pack 10 in the aforementioned embodiment 1 can be performed by the server device 50.

For example, in the registration system 100 of the aforementioned embodiment 1, the user ID 1 received from the registration card 20 is stored in the first storage device 13; however, the user ID 1 may be stored in the server device 50. That is, the server device 50 may function as a storage device provided outside of the storage battery pack 10a. Hereinafter, an operation example of this kind will be described using FIG. 15.

First, pairing for performing communication based on the BT communication standard is performed using NFC (the first wireless communication device 11 and the second wireless communication device 31) (S400). Next, the user ID 1, which is received by means of NFC from the registration card 20 to which the first wireless communication device 11 is in close proximity, is transmitted to the first information terminal 30b by means of communication based on the BT communication standard using the third wireless communication device 16 and the fourth wireless communication device 36 (S401). The user ID is then transmitted to the server device 50 by the fifth wireless communication device 37 (S402), and stored in the server device 50.

Furthermore, in the aforementioned embodiment 1, the comparison of user IDs, which is performed when the user brings an information terminal that he or she wishes to register as a first type of information terminal into close proximity, may also be performed in the server device 50. Similarly, the registration information may be stored in the server device 50, and the storage battery pack 10a may register an information terminal in the registration information within the server device 50. That is, the storage battery pack 10a may register an information terminal in the registration information stored in the server device 50, which is a storage device provided outside of the storage battery pack 10a.

In this case, pairing is performed using NFC (S400), and a user ID received from an information terminal is transmitted to the first information terminal 30b by means of communication based on the BT communication standard together with a compare and register instruction transmitted via the third wireless communication device 16 by the first control device 12 (S401). The user ID and the compare and register instruction are then transmitted to the server device 50 by the fifth wireless communication device 37 (S402), and a comparison as to whether the user ID matches a user ID already stored in the server device 50 and registration based on the comparison result are performed. Thereafter, the server device 50 transmits a registration result to the fifth wireless communication device 37 (S403).

It should be noted that, in the case where an information terminal is registered in the registration information within the server device 50, a terminal ID for individually specifying the information terminal is also transmitted to the server device 50 in accordance with the communication sequence depicted in FIG. 15.

It should be noted that the registration result, as required, may additionally be transmitted to the storage battery pack 10a by means of communication based on the BT communication standard (S404). For example, the storage battery pack 10a is provided with a sound output device (not depicted), and the registration result is transmitted to the storage battery pack 10a in the case where a sound is output when registration has been completed.

Embodiment 2

[Registration Operation of Information Terminal According to Embodiment 2]

Figure 16:
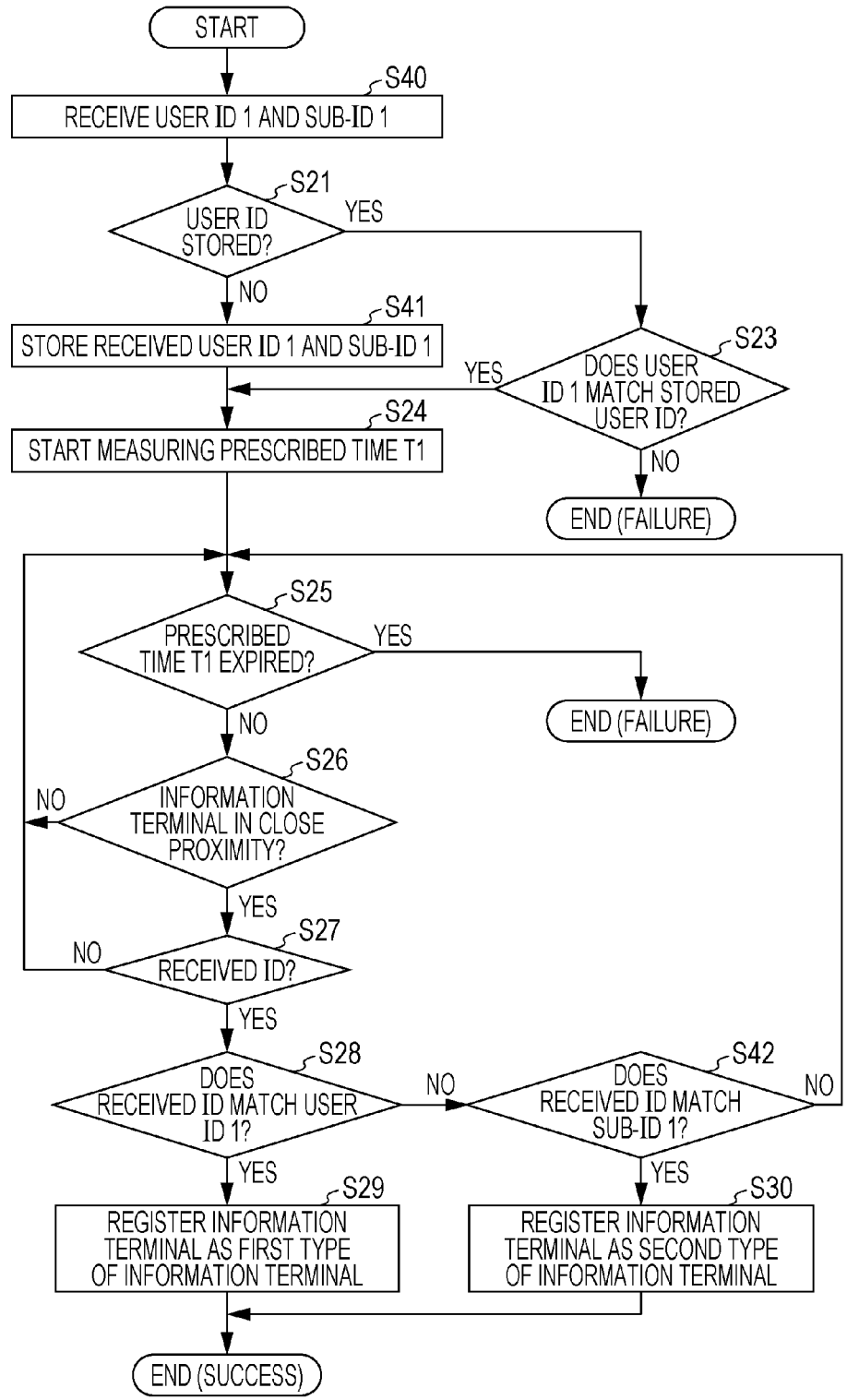
FIG. 16 is a flowchart of a registration operation of a storage battery pack according to embodiment 2.

In embodiment 2, a description will be given regarding an example in which a sub-ID 1 is stored in the first storage device 13 in addition to the user ID 1. FIG. 16 is a flowchart of a registration operation of the storage battery pack 10 according to embodiment 2. The sub-ID 1 is an example of second identification information, and is an ID used for determining whether or not an information terminal is registered as a second type of information terminal.

It should be noted that, in embodiment 2 hereinafter, steps that are substantially the same as the steps described in FIG. 6 are denoted by the same reference symbols and a description thereof has been omitted. Furthermore, descriptions that overlap with FIG. 6 have also been omitted. In embodiment 2, a description will be given regarding a registration operation in which the aforementioned registration system 100 (the storage battery pack 10 and the first information terminal 30) is used; however, the same registration operation may be performed using the registration system 100a or the registration system 100b.

In embodiment 2, the user ID 1 and the sub-ID 1 are stored on the registration card 20. When the user brings the registration card 20 close to the storage battery pack 10, the first wireless communication device 11 receives the user ID 1 and the sub-ID 1, which are transmitted from the registration card 20 (S40).

Next, the first control device 12 determines whether or not a user ID is stored in the first storage device 13 (S21). In the case where a user ID is not stored in the first storage device 13 (no in S21), the first control device 12 stores the received user ID 1 and sub-ID 1 in the first storage device 13 (S41), and the processing of step S24 is performed.

Thereafter, if it is determined that an ID has been received from an information terminal that is in close proximity (yes in S27), and the received ID does not match the user ID 1 (no in S28), the first control device 12 determines whether or not the received user ID matches the sub-ID 1 (S42). If the received user ID matches the sub-ID 1 (yes in S42), the first control device 12 registers the information terminal in the registration information within the first storage device 13 as a second type of information terminal (S30). However, if the received ID does not match the sub-ID 1 (no in S42), the first control device 12 performs the determination processing of step S25 as to whether or not the prescribed time T1 has expired.

[Effects Etc. of Embodiment 2]

In embodiment 2, in the case where it is desired for the second information terminal 40 to be additionally registered as a second type of information terminal, first, the user brings the registration card 20 or the first information terminal 30, to which the user ID 1 and the sub-ID 1 have been input, close to the storage battery pack 10. Thereafter, it is sufficient for the user to bring the second information terminal 40, to which the sub-ID 1 has been input, close to the storage battery pack 10 within the prescribed time T1.

At such time, when the second information terminal 40, which does not retain the user ID 1 and retains the sub-ID 1 that is different from the user ID 1, is in close proximity, the first control device 12 registers the second information terminal 40 in the registration information as a second type of information terminal.

It is thereby possible to suppress an information terminal not retaining the sub-ID 1 from being erroneously registered as a second type of information terminal.

Embodiment 3

[Registration Operation of Information Terminal According to Embodiment 3]

Figure 17:
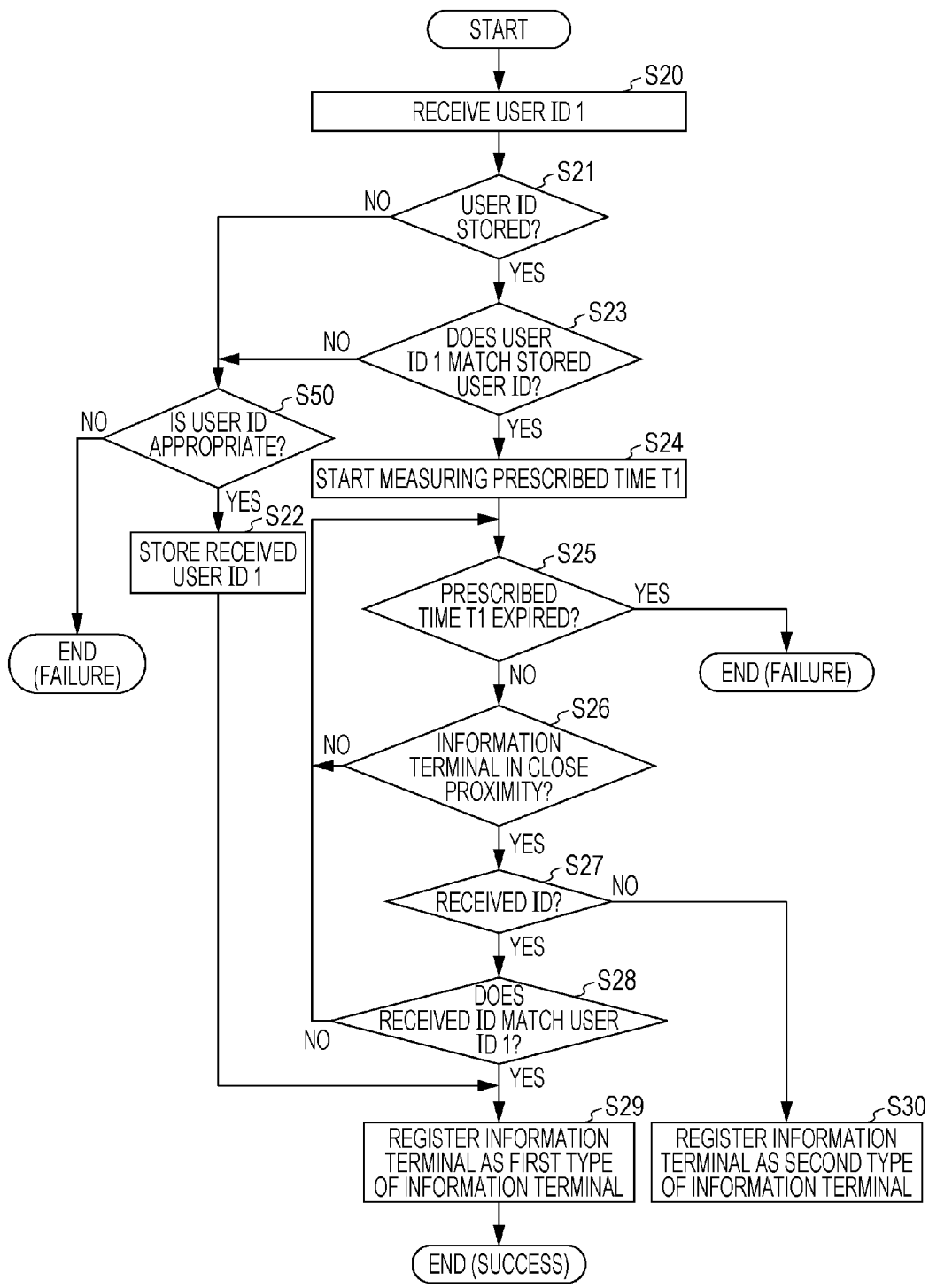
FIG. 17 is a flowchart of a registration operation of a storage battery pack according to embodiment 3.

In embodiment 3, a description will be given regarding an example in which, when a user ID received from an information terminal is not stored in the first storage device 13, the information terminal is registered in registration information on the basis of a determination as to whether the user ID is an appropriate ID. FIG. 17 is a flowchart of a registration operation of a storage battery pack 10 according to embodiment 3.

It should be noted that, in embodiment 3 hereinafter, steps that are substantially the same as the steps described in FIG. 6 are denoted by the same reference symbols and a description thereof has been omitted. Furthermore, descriptions that overlap with FIG. 6 have also been omitted. The configurations of the storage battery pack 10 and the first information terminal 30 are the same as the configurations depicted in FIG. 3. In embodiment 3, a description will be given regarding a registration operation in which the aforementioned registration system 100 (the storage battery pack 10 and the first information terminal 30) is used; however, the same registration operation may be performed using the registration system 100a or the registration system 100b.

First, the first wireless communication device 11 receives the user ID 1 from the first information terminal 30 (S20). Next, the first control device 12 determines whether or not a user ID is stored in the first storage device 13 (S21). In the case where a user ID is not stored in the first storage device 13 (no in S21), the first control device 12 determines whether the received user ID 1 is an appropriate user ID (S50).

For example, if appropriate user IDs are generated based on a prescribed rule as in the case of so-called serial numbers (product keys), the first control device 12 is able to determine whether or not the user ID 1 is appropriate by means of a predetermined algorithm.

If it is determined that the received user ID 1 is an appropriate user ID (yes in S50), the first control device 12 stores the user ID 1 in the first storage device 13 (S22), and the processing of step S29 is performed. However, if it is determined that the user ID 1 is not appropriate (no in S50), this is treated as a registration failure and the processing ends.

Furthermore, in the case where the user ID 1 received from the first information terminal 30 is not stored in the first storage device 13 (no in S23) even though there is a user ID stored in the first storage device 13 (yes in S21), the first control device 12 determines whether the received user ID 1 is an appropriate ID (S50).

Furthermore, in the case where the user ID 1 received from the first information terminal 30 is stored in the first storage device 13 (yes in S23), processing advances to step S24. The steps thereafter are the same as in FIG. 6, and therefore a description thereof has been omitted.

It should be noted that, even if step S21 is omitted, the flow does not substantially change owing to the presence of step S23, and therefore step S21 may be omitted.

[Effects Etc. of Embodiment 3]

In this way, when the first information terminal 30 comes into close proximity, the first control device 12 of the storage battery pack 10 acquires the user ID 1 from the first information terminal 30 via the first wireless communication device 11. When the acquired user ID 1 is not stored in the first storage device 13, it is determined whether or not the user ID 1 is appropriate. Then, if it is determined that the user ID 1 is appropriate, the first information terminal 30 is registered as a first type of information terminal by the first control device 12.

It is thereby possible to suppress the registration of an information terminal by means of an improper user ID.

It should be noted that, in the registration system 100b, the determination as to whether the user ID 1 is an appropriate user ID may be performed by the server device 50 that is provided outside of the storage battery pack 10.

In this case, when the first information terminal 30b comes into close proximity, the first control device 12 of the storage battery pack 10 acquires the user ID 1 from the first information terminal 30b via the first wireless communication device 11. When the acquired user ID 1 is not stored in the first storage device 13, whether or not the user ID 1 is appropriate is confirmed in the server device 50 provided outside of the storage battery pack 10a. Specifically, the user ID 1 is transmitted and received based on the communication sequence described using FIG. 15, and the determination as to whether or not the user ID 1 is appropriate is performed by the server device 50. Then, if it is determined that the user ID 1 is appropriate, the first information terminal 30b is registered as a first type of information terminal by the first control device 12.

It is thereby possible to suppress the registration of an information terminal by means of an improper user ID.

Embodiment 4

[Registration Operation of Information Terminal According to Embodiment 4]

Figure 18:
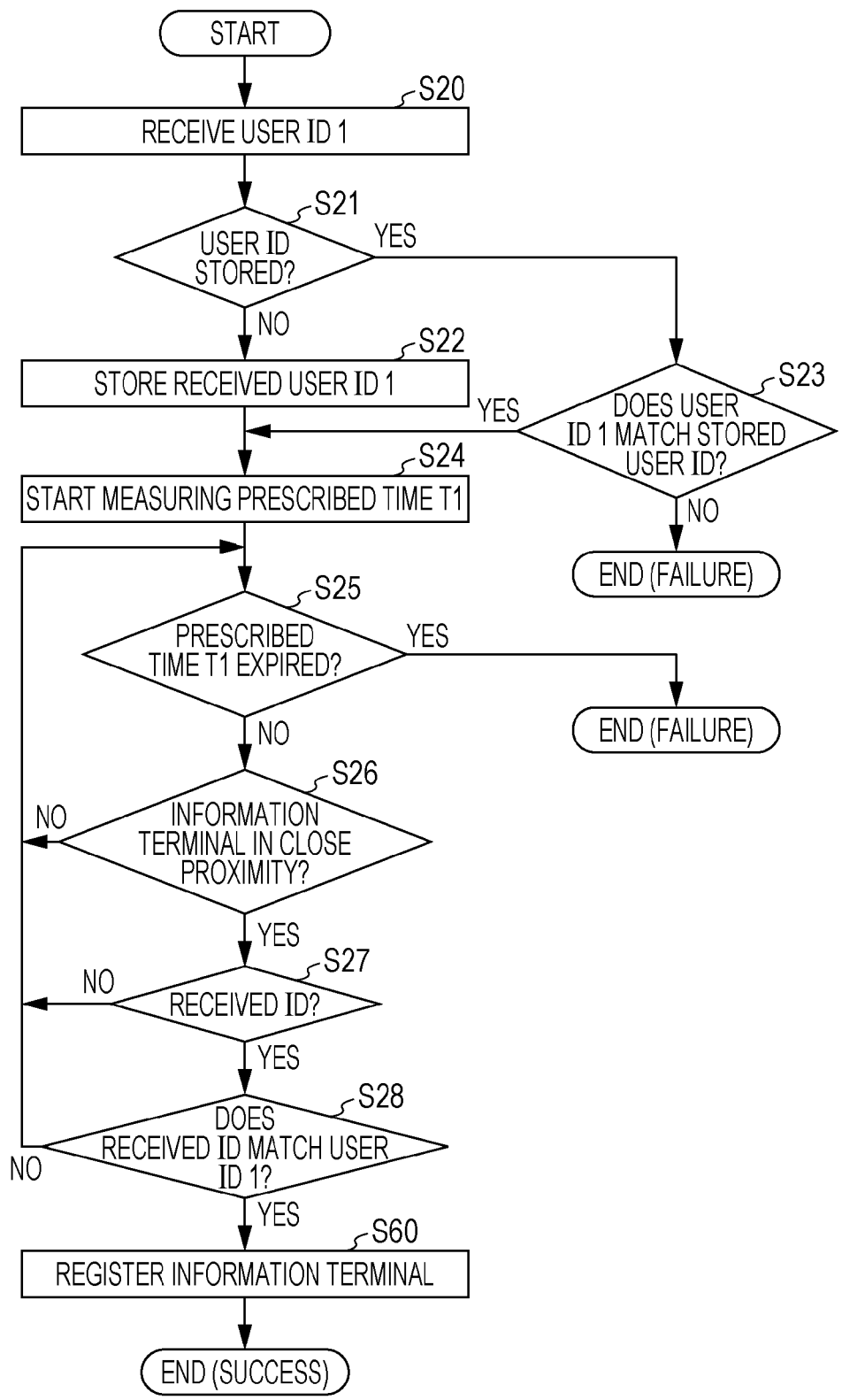
FIG. 18 is a flowchart of a registration operation of a storage battery pack according to embodiment 4.

In embodiment 4, a description will be given regarding an example in which there is no distinction between a first type of information terminal and a second type of information terminal. That is, in embodiment 4, a description will be given regarding an example in which information terminals registered in registration information all have the same privileges as a first-type information terminal, or all have the same privileges as a second-type information terminal. FIG. 18 is a flowchart of a registration operation of a storage battery pack 10 according to embodiment 4.

It should be noted that, in embodiment 4 hereinafter, steps that are substantially the same as the steps described in FIG. 6 are denoted by the same reference symbols and a description thereof has been omitted. Furthermore, descriptions that overlap with FIG. 6 have also been omitted. The configurations of the storage battery pack 10 and the first information terminal 30 are the same as the configurations depicted in FIG. 3. In embodiment 4, a description will be given regarding a registration operation in which the aforementioned registration system 100 (the storage battery pack 10 and the first information terminal 30) is used; however, the same registration operation may be performed using the registration system 100a or 100b.

In step S27, if it is determined that a user ID has been received from an information terminal that is in close proximity (yes in S27), the first control device 12 determines whether or not the received user ID matches the user ID 1 (S28). If the received user ID matches the user ID 1 (yes in S28), the first control device 12 registers the information terminal in the registration information within the first storage device 13 (S60). However, if the received user ID does not match the user ID 1 (no in S28), the first control device 12 performs the determination processing of step S25 as to whether or not the prescribed time T1 has expired. Also in the case where it is determined in step S27 that an ID has not been received from the information terminal that has come into close proximity (no in S27), the first control device 12 performs the determination processing of step S25 as to whether or not the prescribed time T1 has expired.

[Effects Etc. of Embodiment 4]

As described above, the distinction between a first type of information terminal and a second type of information terminal is not essential. Information terminals to which the user ID 1 has been input may all be registered as first-type information terminals or may all be registered as second-type information terminals.

Embodiment 5

[Registration Operation of Information Terminal According to Embodiment 5]

In embodiment 5, a description will be given regarding an example in which the input of a user ID to an information terminal is omitted.

That is, in the example of embodiment 5, the user is able to register an information terminal to which a user ID has not been input, in registration information by bringing the information terminal close to the storage battery pack. FIG. 19 is a flowchart of a registration operation of a storage battery pack 10 according to embodiment 5.

It should be noted that, in embodiment 5 hereinafter, steps that are substantially the same as the steps described in FIG. 6 are denoted by the same reference symbols and a description thereof has been omitted. Furthermore, descriptions that overlap with FIG. 6 have also been omitted. In embodiment 5, a description will be given regarding a registration operation in which the aforementioned registration system 100 (the storage battery pack 10 and the first information terminal 30) is used; however, the same registration operation may be performed using the registration system 100a or 100b.

Furthermore, in embodiment 5, a description will be given regarding a case in which there is no distinction between a first type of information terminal and a second type of information terminal as in embodiment 4.

If the prescribed time T1 has not expired in step S25 (no in S25), the first control device 12 determines whether or not an information terminal is in close proximity (S26). If it is determined that an information terminal is not in close proximity (no in S26), the first control device 12 performs the determination processing of step S25 as to whether or not the prescribed time T1 has expired.

However, if it is determined that an information terminal is in close proximity (yes in S26), the first control device 12 registers the information terminal that has come into close proximity in registration information within the first storage device 13 (S60). It should be noted that a user ID has not been input to the information terminal determined as being in close proximity to the storage battery pack in S26. That is, the information terminal is not retaining a user ID.

[Effects Etc. of Embodiment 5]

As described above, the input of the user ID 1 is not essential. Even with a configuration of this kind, in order to start registration processing for an information terminal, it is necessary to bring a device retaining the user ID 1 such as the registration card 20 or the first information terminal 30, to which the user ID 1 has been input, close to the storage battery pack 10, and therefore it can be said that registration processing is performed under a certain restriction.

Other Embodiments

As described above, embodiments 1 to 5 have been described as exemplifications of the techniques disclosed in the present application. However, the techniques in the present disclosure are not limited to the aforementioned and can also be applied to an embodiment in which an alteration, substitution, addition, omission or the like has been implemented as appropriate. Furthermore, it is also possible to combine the constituent elements described in the aforementioned embodiments 1 to 5 to obtain a new embodiment.

For example, in order for a registration operation to not be performed erroneously, the storage battery pack may have a radio-wave shielding object affixed in a region of the casing of the storage battery pack corresponding to the first wireless communication device when in the initial state (when shipped). The radio-wave shielding object, specifically, is a metal sheet such as an aluminum sheet. Furthermore, in order for a registration operation to not be performed erroneously, the storage battery pack may be provided with a push button for starting the registration operation. The user is able to store a user ID 1 in the first storage device by pressing the push button and then bringing a device retaining the user ID 1 close to the storage battery pack.

Furthermore, in each of the aforementioned embodiments, each constituent element (for example, the first control device and the second control device) may be configured by using dedicated hardware, or may be realized by executing a software program suitable for each constituent element. Each of the constituent elements may be realized by a program execution unit such as a CPU or a processor reading out and executing a software program recorded in a recording medium such as a hard disk or a semiconductor memory.

Furthermore, the present disclosure may be realized as a system, a method, an integrated circuit, a computer program, or a recording medium such as a computer-readable CD-ROM, and may be realized by an arbitrary combination of a system, a method, an integrated circuit, a computer program, and a recording medium. For example, the present disclosure may be realized as a storage battery pack or a registration system according to the aforementioned embodiments. Furthermore, the present disclosure may be realized as a program executed by a first control device according to the aforementioned embodiments.

Furthermore, in each of the aforementioned embodiments, processing executed by a specific processing unit may be executed by a separate processing unit. Furthermore, the order of the plurality of processing may be altered, and the plurality of processing may be executed in parallel.

Hereinabove, a method for controlling a storage battery pack according to one or more aspects has been described based on the embodiments; however, the present disclosure is not limited to these embodiments. Modes in which various modifications conceived by a person skilled in the art have been implemented in the present embodiments, and modes constructed by combining the constituent elements in different embodiments may also be included within the scope of one or more aspects provided they do not depart from the gist of the present disclosure.

The present disclosure, for example, is able to be used in a storage battery pack that is employed as a power source for an electric vehicle or the like.

What is claimed is:

1. A method, comprising:
    (a) when a first information terminal, which is provided with a wireless communicator that communicates with a first wireless communicator provided in a storage battery pack, wherein the first information terminal retains first identification information indicating a user of the storage battery pack, comes into close proximity with the first wireless communicator,
    registering in registration information the first information terminal as a first type of information terminal that alters the registration information related to an information terminal registered in the registration information, the altered registration information being stored in a storage that is provided inside or outside of the storage battery pack and having registered therein information terminals that acquire information relating to the storage battery pack;
(c) receiving the first identification information via the first wireless communicator; and
(d1) when a second information terminal, which is provided with a wireless communicator that communicates with the first wireless communicator, wherein the second information terminal does not retain the first identification information, comes into close proximity with the first wireless communicator within a prescribed time from after the first identification information has been received,
automatically registering in the registration information the second information terminal as a second type of information terminal, which is an information terminal that cannot alter the registration information from the storage battery pack, and does acquire, from the storage battery pack, other information relating to the storage battery pack that is different from the registration information.

2. The method according to claim 1,
wherein the first type of information terminal alters the registration information, and acquires the information relating to the storage battery pack from the storage battery pack.

3. The method according to claim 2,
wherein the information relating to the storage battery pack is information indicating a state of the storage battery pack.

4. The method according to claim 2,
wherein the information relating to the storage battery pack is information relating to an electrical device onto which the storage battery pack is mounted.

5. The method according to claim 1, further comprising:
(b) altering content of the registration information based on an instruction to alter the registration information, the instruction being transmitted from the first information terminal registered as the first type of information terminal.

6. The method according to claim 1, further including comprising:
(d2) when a second information terminal, which is provided with a wireless communicator that communicates with the first wireless communicator and which does not retain the first identification information, comes into close proximity with the first wireless communicator after a prescribed time from after the first identification information has been received, not registering in the registration information the second information terminal as a second type of information terminal, which is an information terminal that cannot alter the registration information from the storage battery pack and may acquire from the storage battery pack other information relating to the storage battery pack that is different from the registration information,
wherein the storage battery pack is capable of discharging within the prescribed time and after the prescribed time.

7. The method according to claim 6,
wherein, in the (d1), when the second information terminal, which does not retain the first identification information and retains second identification information that is different from the first identification information, comes into close proximity, registering in the registration information the second information terminal as the second type of information terminal.

8. The method according to claim 6,
wherein the other information relating to the storage battery pack is information indicating a state of the storage battery pack.

9. The method for controlling a storage battery pack according to claim 6,
wherein the other information relating to the storage battery pack is information relating to an electrical device onto which the storage battery pack is mounted.

10. The method according to claim 6,
wherein, in the (c), the first wireless communicator receives the first identification information due to the first information terminal coming into close proximity with the first wireless communicator.

11. The method according to claim 6,
wherein, in the (c), the first wireless communicator receives the first identification information due to a third information terminal, which is provided with a wireless communicator that communicates with the first wireless communicator and which retains the first identification information, coming into close proximity with the first wireless communicator.

12. The method according to claim 1, further comprising:
(e1) when a second information terminal, which is provided with a wireless communicator that communicates with the first wireless communicator and which retains the first identification information, comes into close proximity with the first wireless communicator within a prescribed time from after the first identification information has been received, registering in the registration information the second information terminal as the first type of information terminal; and
(e2) when a second information terminal, which is provided with a wireless communicator that communicates with the first wireless communicator and which retains the first identification information, comes into close proximity with the first wireless communicator after a prescribed time from after the first identification information has been received, not registering in the registration information the second information terminal as the first type of information terminal,
wherein the storage battery pack is capable of discharging within the prescribed time and after the prescribed time.

13. The method according to claim 1, further comprising:
(f) storing identification information in the storage prior to the (a);
(g) when the first information terminal comes into close proximity, acquiring the first identification information retained by the first information terminal; and
(h) comparing the acquired first identification information with the stored identification information,
wherein, in the (a), when the acquired first identification information and the stored identification information match as a result of the comparing, the first information terminal is registered in the registration information as the first type of information terminal.

14. The method according to claim 13,
wherein, in the (f), the identification information is stored in the storage due to an external device, which is provided with a wireless communicator that communicates with the first wireless communicator, retains the first identification information, and is not able to refer to the registration information, coming into close proximity with the first wireless communicator.

15. The method according to claim 1, further comprising:
(i) when the first information terminal comes into close proximity, acquiring the first identification information via the first wireless communicator from the first information terminal, and determining whether or not the acquired first identification information is appropriate,
wherein the (a) is executed when it is determined in the (i) that the first identification information is appropriate.

16. The method according to claim 1, further comprising:
(j) when the first information terminal comes into close proximity, acquiring the first identification information via the first wireless communicator from the first information terminal, and confirming in a server provided outside of the storage battery pack whether or not the acquired first identification information is appropriate,
wherein the (a) is executed when it is confirmed in the (j) that the first identification information is appropriate.

17. The method according to claim 1,
wherein the registration information includes information indicating either the first type of information terminal or a second type of a second type of information terminal, the second type of information terminal being an information terminal that cannot alter the registration information from the storage battery pack, and does acquire, from the storage battery pack, other information relating to the storage battery pack that is different from the registration information.

18. A storage battery pack, comprising:
a first wireless communicator that wirelessly communicates with a first information terminal; and
a controller that,
  (a) when the first information terminal retaining first identification information indicating a user of the storage battery pack comes into close proximity with the first wireless communicator, registers the first information terminal in registration information as a first type of information terminal that alters the registration information related to an information terminal registered in the registration information, the altered registration information being stored in a storage that is provided inside or outside of the storage battery pack and having registered therein information terminals that acquire information relating to the storage battery pack;
  (c) receives the first identification information via the first wireless communicator; and
  (d1) when a second information terminal, which is provided with a wireless communicator that communicates with the first wireless communicator, wherein the second information terminal does not retain the first identification information, comes into close proximity with the first wireless communicator within a prescribed time from after the first identification information has been received,
automatically registers in the registration information the second information terminal as a second type of information terminal, which is an information terminal that cannot alter the registration information from the storage battery pack, and acquires, from the storage battery pack, other information relating to the storage battery pack that is different from the registration information.

19. A method, comprising:
(a) when a first information terminal, which is provided with a wireless communicator that communicates with a first wireless communicator provided in a storage battery pack, wherein the first information terminal retains first identification information indicating a user of the storage battery pack, comes into close proximity with the first wireless communicator,
registering in registration information the first information terminal as a first type of information terminal that alters the registration information related to an information terminal registered in the registration information, the registration information being stored in a storage that is provided inside or outside of the storage battery pack and having registered therein information terminals that acquire information relating to the storage battery pack;
(c) receiving the first identification information via the first wireless communicator;
(d1) when a second information terminal, which is provided with a wireless communicator that communicates with the first wireless communicator, wherein the second information terminal does not retain the first identification information, comes into close proximity with the first wireless communicator within a prescribed time from after the first identification information has been received,
registering in the registration information the second information terminal as a second type of information terminal, which is an information terminal that cannot alter the registration information from the storage battery pack, and does acquire, from the storage battery pack, other information relating to the storage battery pack that is different from the registration information; and
(d2) when a second information terminal, which is provided with a wireless communicator that communicates with the first wireless communicator and which does not retain the first identification information, comes into close proximity with the first wireless communicator after a prescribed time from after the first identification information has been received, not registering in the registration information the second information terminal as a second type of information terminal, which is an information terminal that cannot alter the registration information from the storage battery pack and may acquire from the storage battery pack other information relating to the storage battery pack that is different from the registration information,
wherein the storage battery pack is capable of discharges within the prescribed time and after the prescribed time,
wherein, in the (c), the first wireless communicator receives the first identification information due to an external device coming into close proximity with the first wireless communicator,
and wherein the external device is a device that is provided with a wireless communicator that communicates with the first wireless communicator, retains the first identification information, and is not able to refer to the registration information.

20. The method according to claim 19,
wherein the external device includes a registration card.

* * * * *